United States Patent
Kobayashi et al.

[11] Patent Number: 5,448,413
[45] Date of Patent: Sep. 5, 1995

[54] APPARATUS FOR CONTROLLING THE LENS POSITION OF A ZOOM LENS

[75] Inventors: Takaaki Kobayashi, Yokohama; Susumu Fukita, Kawasaki; Yuzo Kato, Yokohama; Jun Hosoya, Yokohama; Ryuji Ohmuro, Yokohama; Junichi Kasuya, Kawasaki; Setsuo Yoshida, Yokohama; Noboru Suzuki, Yokahama, all of Japan

[73] Assignee: Canon Kabushiki Kaisha, Tokyo, Japan

[21] Appl. No.: 347,180

[22] Filed: Nov. 22, 1994

Related U.S. Application Data

[63] Continuation of Ser. No. 25,815, Mar. 3, 1993, abandoned, which is a continuation of Ser. No. 877,974, May 4, 1992, abandoned.

[30] Foreign Application Priority Data

May 11, 1991 [JP] Japan .................. 3-135952
May 11, 1991 [JP] Japan .................. 3-135953
Jun. 14, 1991 [JP] Japan .................. 3-170696
Jun. 14, 1991 [JP] Japan .................. 3-170697
Jun. 14, 1991 [JP] Japan .................. 3-170698
Jun. 14, 1991 [JP] Japan .................. 3-170699

[51] Int. Cl.[6] ............................. G02B 15/14
[52] U.S. Cl. ...................... 359/698; 359/695; 359/697; 354/402
[58] Field of Search ............ 359/694, 695, 696, 697, 359/698; 358/225; 354/400, 402, 202, 403, 408; 250/201.2

[56] References Cited

U.S. PATENT DOCUMENTS

| | | | |
|---|---|---|---|
| 4,043,642 | 8/1977 | Hirose et al. | 359/697 |
| 4,043,672 | 8/1977 | Baumgartner | 356/152 |
| 4,161,756 | 7/1979 | Thomas | 358/225 |
| 4,841,325 | 6/1989 | Hoshino et al. | 354/402 |
| 4,861,146 | 8/1989 | Hatase et al. | 359/698 |
| 4,881,799 | 11/1989 | Ohno et al. | 359/698 |
| 4,914,464 | 4/1990 | Azuma et al. | 354/400 |
| 5,117,246 | 5/1992 | Takahashi et al. | 354/202 |
| 5,130,734 | 7/1992 | Taniguchi et al. | 354/400 |

FOREIGN PATENT DOCUMENTS 52-15226 2/1977 Japan .
60-143309 7/1985 Japan .

*Primary Examiner*—Georgia Y. Epps
*Assistant Examiner*—Thomas Robbins
*Attorney, Agent, or Firm*—Fitzpatrick, Cella, Harper & Scinto

[57] ABSTRACT

The present invention relates to an apparatus for controlling the lens position of a zoom lens. The zoom lens comprises a plurality of lens units movable along the optical axis for zooming, a focal length setting unit for setting the focal length of the zoom lens, an object distance setting unit for setting an object distance, a store containing a plurality of inherent coefficients and an arithmetic logic unit which specifies focal length information and object distance information as variables, and uses the coefficients in calculating a position to which a lens unit should move.

12 Claims, 25 Drawing Sheets

FIG. 2

| | W | | | | | | | | T |
|---|---|---|---|---|---|---|---|---|---|
| INF | $Z_{00}$ | $Z_{01}$ | $Z_{02}$ | $Z_{03}$ | $Z_{04}$ | $Z_{05}$ | $Z_{06}$ | $Z_{07}$ | $Z_{08}$ |
| | $Z_{10}$ | $Z_{11}$ | $Z_{12}$ | $Z_{13}$ | $Z_{14}$ | $Z_{15}$ | $Z_{16}$ | $Z_{17}$ | $Z_{18}$ |
| | $Z_{20}$ | $Z_{21}$ | ″ | ″ | ″ | ″ | ″ | $Z_{27}$ | $Z_{28}$ |
| Y ↓ | $Z_{30}$ | $Z_{31}$ | ″ | ″ | ″ | ″ | ″ | $Z_{37}$ | ″ |
| | $Z_{40}$ | $Z_{41}$ | ″ | ″ | ″ | ″ | ″ | ″ | ″ |
| | $Z_{50}$ | $Z_{51}$ | ″ | ″ | ″ | ″ | ″ | ″ | ″ |
| MOD | $Z_{60}$ | $Z_{61}$ | ″ | ″ | ″ | ″ | ″ | ″ | $Z_{68}$ |

X →

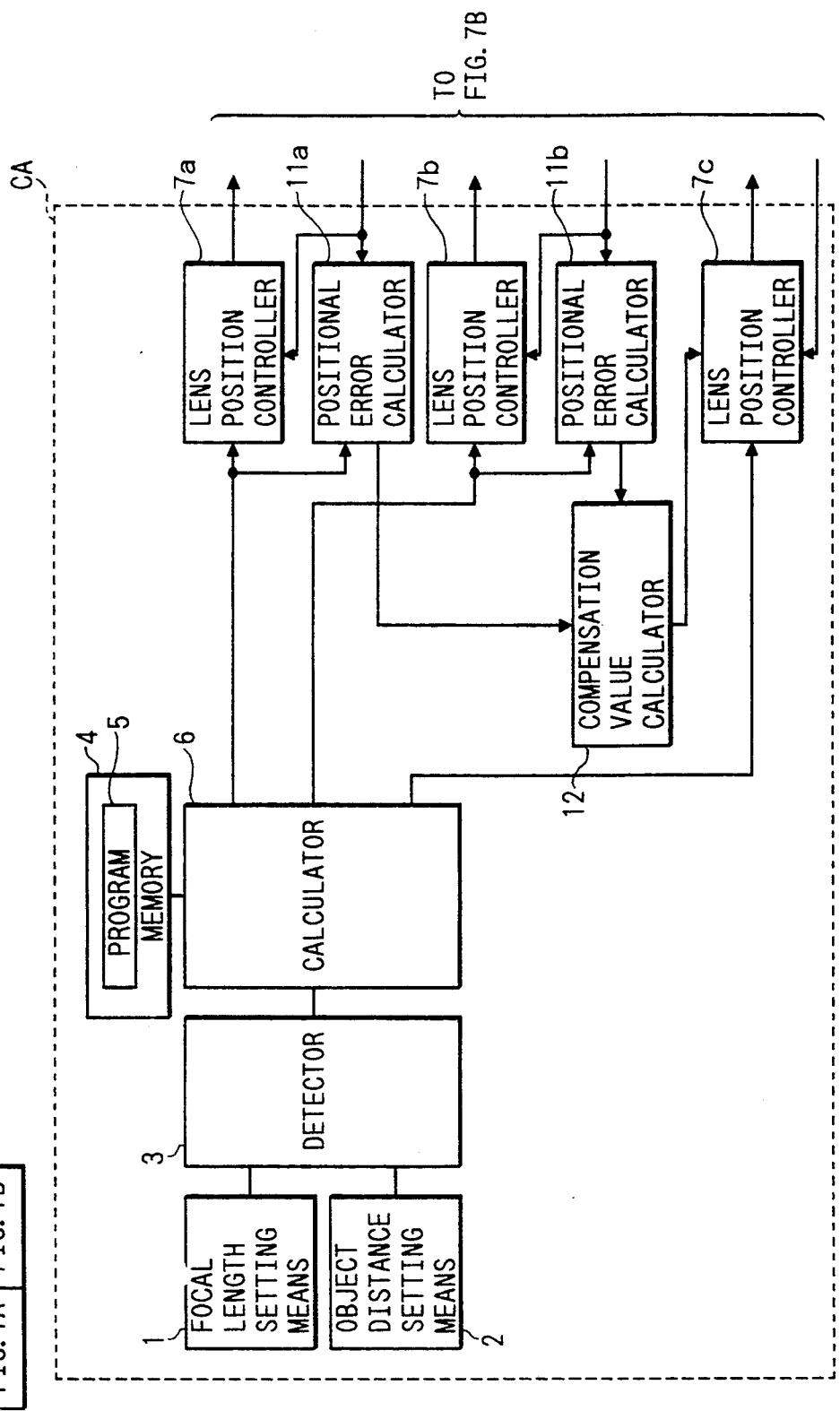

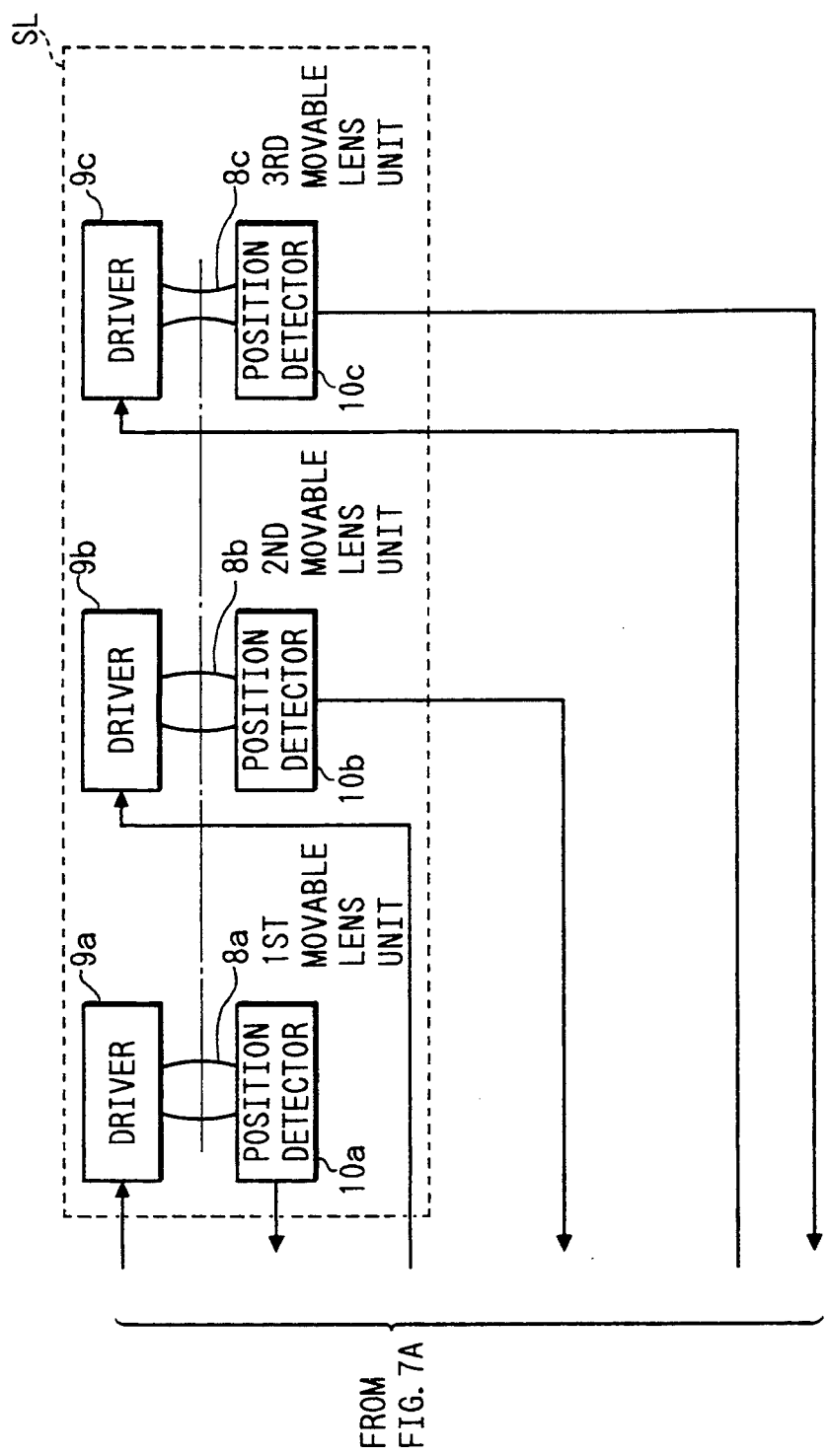

FIG. 8

|  | W | | | | T |
|---|---|---|---|---|---|
| INF | $a_{11}$ $b_{11}$ $c_{11}$ | $a_{12}$ $b_{12}$ $c_{12}$ | $a_{13}$ $b_{13}$ $c_{13}$ | $a_{14}$ $b_{14}$ $c_{14}$ | $a_{15}$ $b_{15}$ $c_{15}$ |
| | $a_{21}$ $b_{21}$ $c_{21}$ | $a_{22}$ $b_{22}$ $c_{22}$ | $a_{23}$ $b_{23}$ $c_{23}$ | $a_{24}$ $b_{24}$ $c_{24}$ | $a_{25}$ $b_{25}$ $c_{25}$ |
| | $a_{31}$ $b_{31}$ $c_{31}$ | $a_{32}$ $b_{32}$ $c_{32}$ | $a_{33}$ $b_{33}$ $c_{33}$ | $a_{34}$ $b_{34}$ $c_{34}$ | $a_{35}$ $b_{35}$ $c_{35}$ |
| | $a_{41}$ $b_{41}$ $c_{41}$ | $a_{42}$ $b_{42}$ $c_{42}$ | $a_{43}$ $b_{43}$ $c_{43}$ | $a_{44}$ $b_{44}$ $c_{44}$ | $a_{45}$ $b_{45}$ $c_{45}$ |
| MOD | $a_{51}$ $b_{51}$ $c_{51}$ | $a_{52}$ $b_{52}$ $c_{52}$ | $a_{53}$ $b_{53}$ $c_{53}$ | $a_{54}$ $b_{54}$ $c_{54}$ | $a_{55}$ $b_{55}$ $c_{55}$ | x →, y ↓

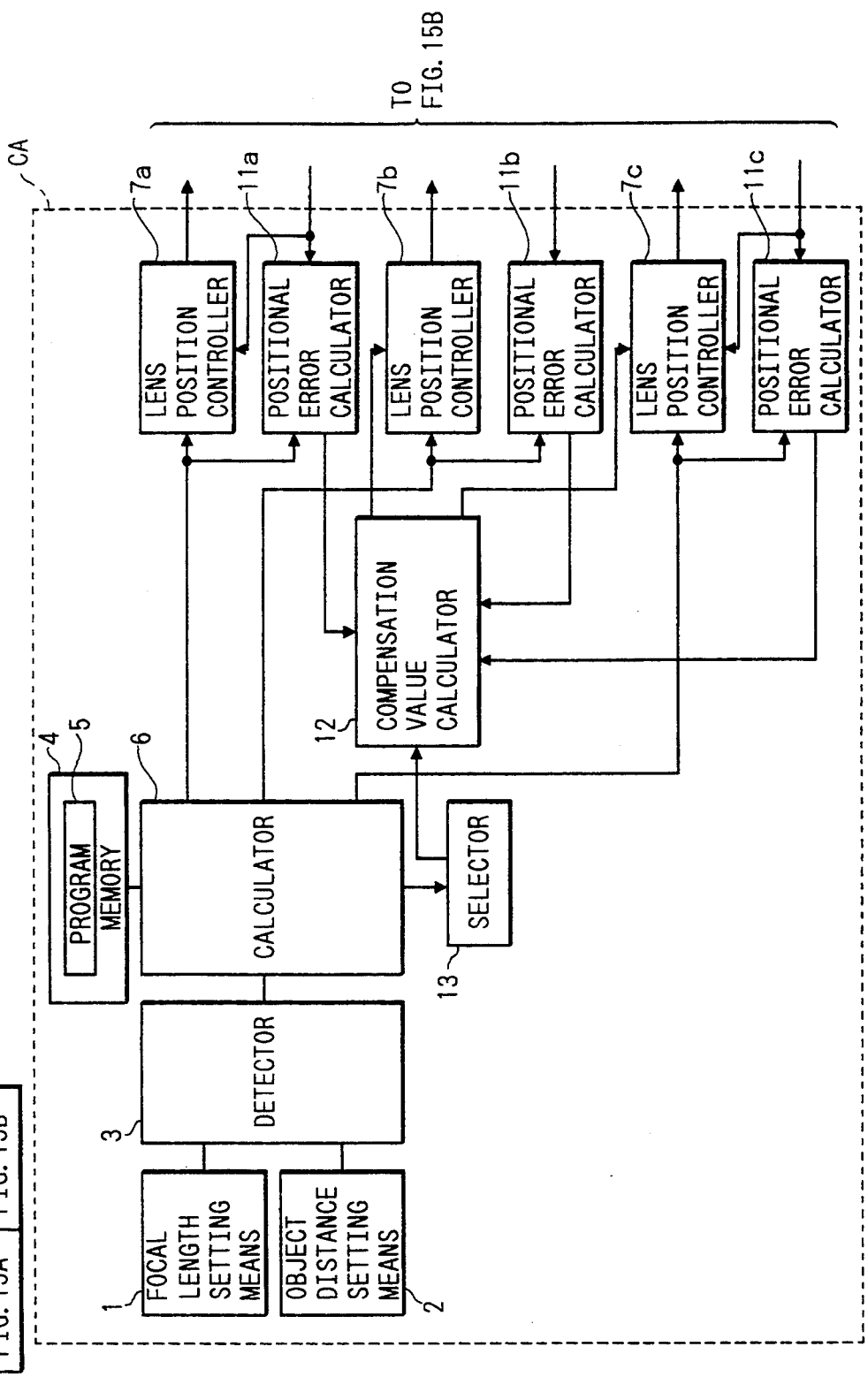

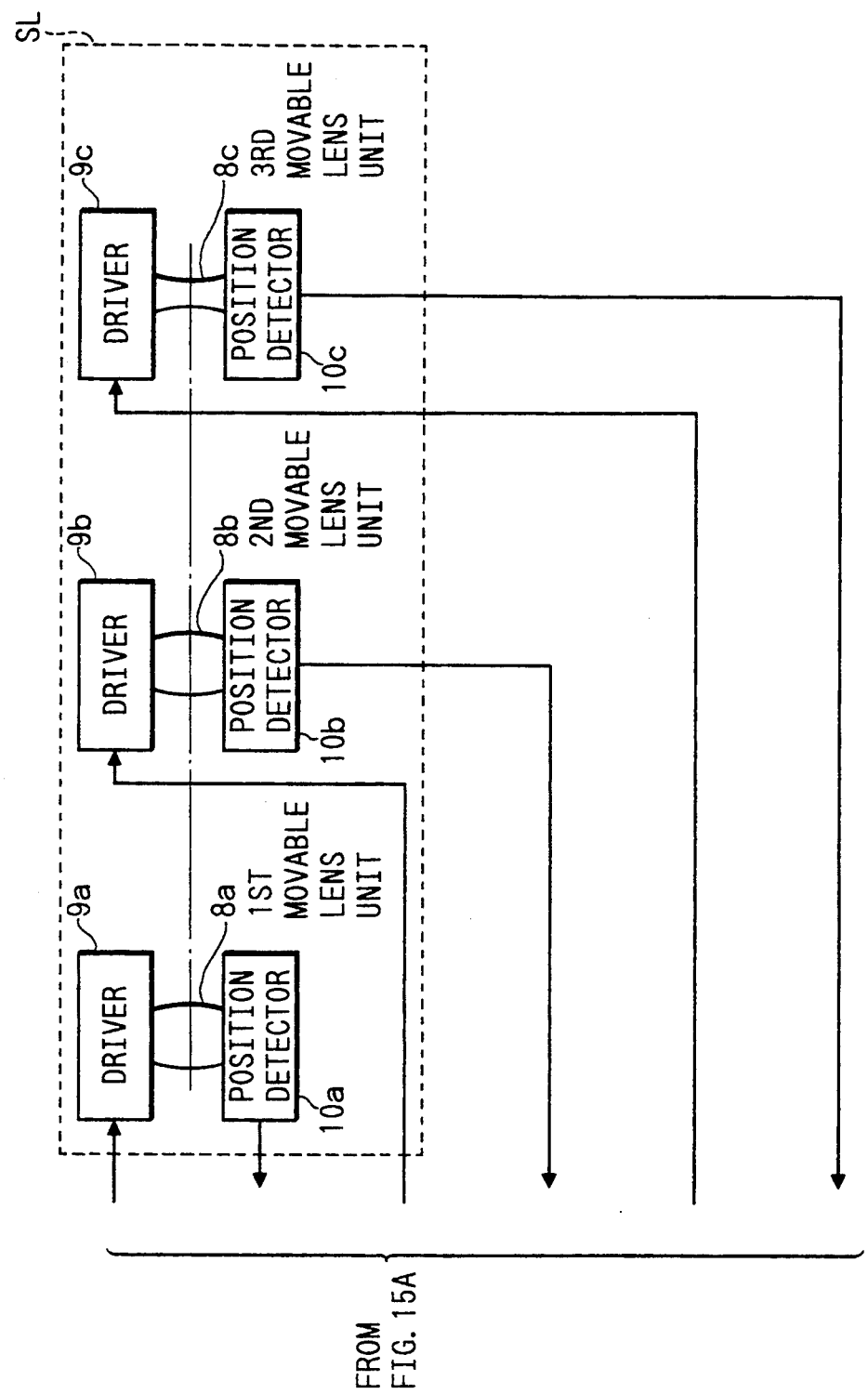

APPARATUS FOR CONTROLLING THE LENS POSITION OF A ZOOM LENS

This application is a continuation of application Ser. No. 08/025,815, filed Mar. 3, 1993, which is a continuation of application Ser. No. 07/877,974, filed May 4, 1992, both now abandoned.

BACKGROUND OF THE INVENTION

1. Field of the Invention

The present invention relates to a camera system suitable for a TV camera, a video camera, or a 35-mm film photographic camera. More particularly, this invention is concerned with a camera system having a rear-focus zoom lens made up of a plurality of lens units capable of moving independently during, especially, zooming or focusing.

2. Related Background Art

As for zoom lenses employed in TV cameras, video cameras, or photographic cameras, a variety of rear-focus zoom lenses have been proposed in the past. Herein, a lens unit other than the first lens unit near an object is moved for focusing.

In general, the effective diameter of the first lens unit in a rear-focus zoom lens is smaller than that in a zoom lens in which the first lens unit is moved for focusing. This permits a compact lens system and simplifies proximity photography, especially, super proximity photography. Furthermore, since a relatively small and lightweight lens unit is moved to achieve focusing, only a small drive force is needed to drive the lens unit. Thus, quick focusing is realized.

FIG. 5 is a schematic diagram showing an optical system centered on a so-called rear-focus zoom lens in which a lens unit 55 or part of a relay lens 53 positioned behind a conventional zooming system or all lens units 53 are moved to perform focusing.

In FIG. 5, a lens unit 51 and a lens unit 54(R) are stationary. A lens unit 52 (V) serving as a varifocal lens changes its position in the optical-axis direction to adjust a focal length. A lens unit 55 (RR lens) or part of a relay lens 53 not only corrects variation of the image plane during zooming but also adjusts focus.

FIG. 6 is an explanatory diagram concerning the zoom lens shown in FIG. 5, wherein the x axis represents the positions of the lens unit 52 (V) or zoom positions and the Y axis represents the positions of the lens unit 55 (RR lens) during focusing.

In the lens configuration shown in FIG. 5, if a subject distance changes or the focal length (zoom position) of the zoom lens varies, the optical-axis position of the lens unit 55 (RR lens) must be changed.

A rear-focus zoom lens having the foregoing configuration has been proposed in, for example, Japanese Patent Publication No. 52-15226 (U.S. Pat. No. 4,043,642). According to this publication, a sensing means is employed to sense the optical-axis positions of a zooming lens unit and a focusing lens unit serving as a compensator. Using the positional information of both the lens units, an arithmetic logic means calculates the optical-axis position of the focusing lens unit at which focusing is attained. Based on the result of the calculation, the focusing lens unit is driven and controlled using a motor.

Japanese Patent Application Laid-Open No. 60-143309 has proposed a zoom lens in which the optical-axis positions of a varifocal lens unit and a compensator lens unit having a focusing function are stored in a storage means in association with the positions of the varifocal lens unit. According to the position of the varifocal lens unit, the position of the compensator lens unit is read from the storage means and thus the compensator lens unit is driven and controlled. The related art disclosed in U.S. Pat. No. 4161756 is well-known.

In a rear-focus zoom lens, generally, the optical-axis position of a focusing lens unit varies, as shown in FIG. 6, depending on a zoom position despite a constant object distance. Therefore, it becomes very important how quickly and precisely the focusing lens unit can be driven and controlled according to the zoom position.

A zoom lens proposed in Japanese Patent Publication No. 52-15226 performs zooming, interprets positional information of lens units, then calculates the optical-axis position of a focusing lens unit. Therefore, the processing time tends to increase.

A zoom lens proposed in Japanese Patent Application Laid-Open No. 60-143309 detects the position of a varifocal lens unit, then interprets the positional information, then reads intended information from lens position information stored in a storage means. This results in an increasing time for focusing. In the range covering a focal length of a zoom lens and an object distance, the position of the focusing lens unit is fixed. This deteriorates precision in lens positioning. To improve positioning precision, storage size of a storage means must be increased.

SUMMARY OF THE INVENTION

The object of the present invention is to provide a camera system capable of controlling drive of a focusing lens unit quickly and precisely using a storage means with a limited capacity in which a set value or set values entered at a focal length setting means and/or an object distance setting means, is assessed. Then, coefficients associated with a focal length and an object distance are computed to obtain the optical-axis position of the focusing lens unit.

In a camera system of the present invention having a zoom lens in which a zooming section made up of multiple lens units is moved along the optical axis to achieve zooming and a focusing section made up of multiple lens units including part of the lens units forming the zooming section is moved along the optical axis to achieve focusing, a focal length setting means inputs focal length information and an object distance setting means inputs object distance information. A detecting means detects the focal length information and object distance information. An arithmetic logic means interprets a detected signal sent from the detecting means, selects associated positional coefficients from a memory which stores positional coefficients of lens units in association with focal length information and object distance information, and then uses the positional coefficients to calculate the optical-axis positions of lens units. A drive means moves the lens units according to a signal sent from the arithmetic logic means.

In the present invention, a plane function is used as a surface function, and plane coefficients, as surface coefficients. A focusing section includes at least one lens unit which is immovable or stationary during zooming, and a zooming section, at least one lens unit of which is stationary during focusing.

BRIEF DESCRIPTION OF THE DRAWINGS

FIG. 2 is an explanatory diagram of a memory shown in FIG. 1;

FIG. 7A and 7B are schematic diagrams of the main unit of an embodiment of the present invention;

FIG. 8 is an explanatory diagram of a memory shown in FIG. 7A;

FIG. 15A and 15B are schematic diagrams of the main section of an embodiment of the present invention;

DESCRIPTION OF THE PREFERRED EMBODIMENTS

Figure 1:
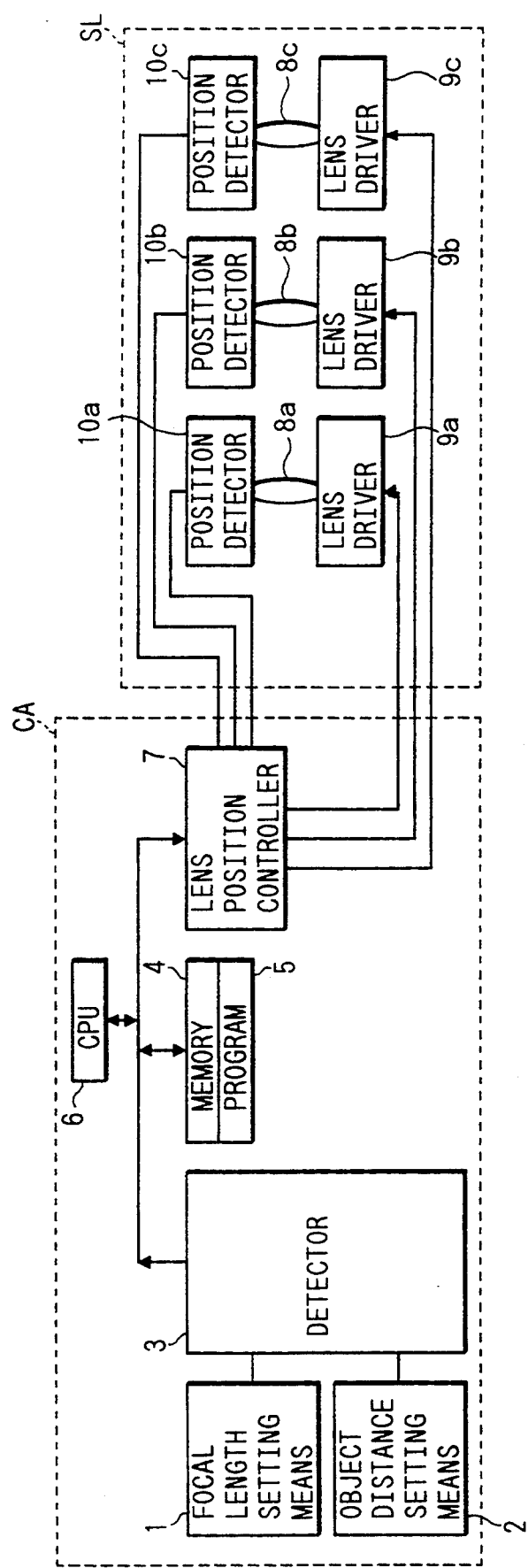
FIG. 1 is a schematic diagram of the main section of a first embodiment of the present invention.

FIG. 1 is a schematic diagram of the main section of the first embodiment of a camera system according to the present invention. In FIG. 1, SL denotes a zoom lens body, and CA, a camera body. The zoom lens SL has at least three lens units 8a, 8b, and 8c. Each lens unit has multiple lenses. During zooming or focusing, at least two of the three lens units 8a to 8c move along the optical axis while retaining a predetermined relationship.

10a to 10c are position detectors, which detect the optical-axis positions of the lens units 8a to 8c and provide a lens position controller 7 with positional information. 9a to 9c are lens drivers, which drive the lens units 8a to 8c according to a drive signal sent from the lens position controller 7.

Focal length setting means 1, which inputs zoom position information (focal length information) for the zoom lens SL, is used by an operator to set a focal length. 2 denotes an object distance setting means for inputting object distance information. 3 denotes a detector, which detects input information sent from the focal length setting means 1 and object distance setting means 2, then inputs the detected information to a CPU 6 serving as an arithmetic logic calculator. 4 is a memory, including a ROM. The memory 4, which will be described later, stores coefficients (positional coefficients) the CPU 6 uses to calculate the optical-axis positions of the lens units 8a to 8c in association with the zoom position of the zoom lens and an object distance.

FIG. 2 is an explanatory diagram for explaining positional coefficients $(Z_{i,j})$ stored in a memory 4. In this embodiment, the optical-axis positions of lens units are represented as points on the surface function (plane function in this embodiment, which, however, may be a curved surface function. See FIG. 4.) of a surface S1 which uses a focal length and an object distance as variables. Then, a CPU 6 uses positional coefficients $(Z_{i,j})$ to calculate surface coefficients (a, b, c) and thus sets the surface function S1. In FIG. 2, positional coefficients $(Z_{i,j})$ are specified with focal length information on the x axis and with object distance information on the y axis.

Then, the memory 4 is divided into multiple areas in both the x and y directions, and stores positional coefficients $(Z_{i,j})$ in the areas. 5 denotes a ROM containing program.

A CPU 6 retrieves predetermined positional coefficient $(Z_{i,j})$ from the memory 4 in response to focal length information x and object distance information y sent from a detector 3, then uses the positional coefficients $(Z_{i,j})$ to obtain surface coefficients (a, b, c) for specifying a surface function S1 as described later. Then, these values a, b, c, x, and y are specified in a program 5 (an expression (1) to be described later) to calculate the optical-axis positions of lens units 8a to 8c. Then, the results of the calculation are put in a lens position controller 7.

The lens position controller 7 controls drive of lens drivers 9a to 9c and thus moves the lens units 8a to 8c to predetermined positions. Thereby, the zoom lens SL is driven and controlled according to input information entered at a focal length setting means 1 and an object distance setting means 2.

Figure 4:
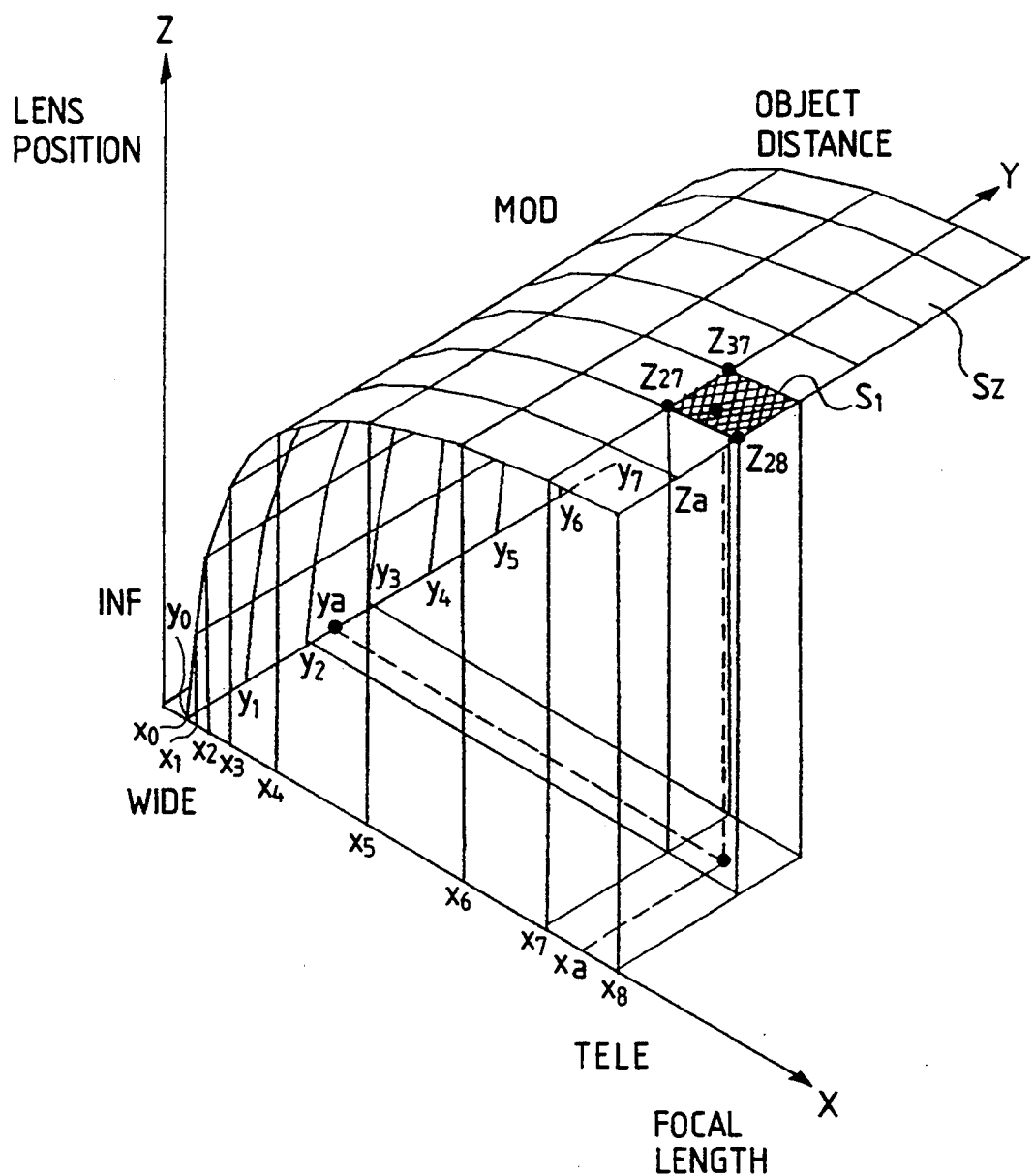
FIG. 4 is an explanatory diagram showing the positions of a lens unit in association with object distances and focal lengths.
Figure 5:
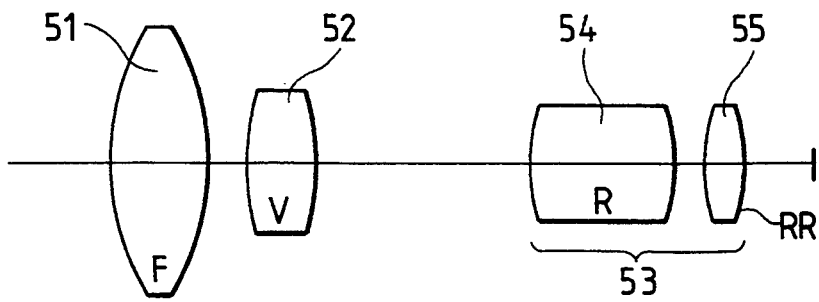
FIG. 5 is a schematic diagram of a conventional rear-focus zoom lens.
Figure 6:
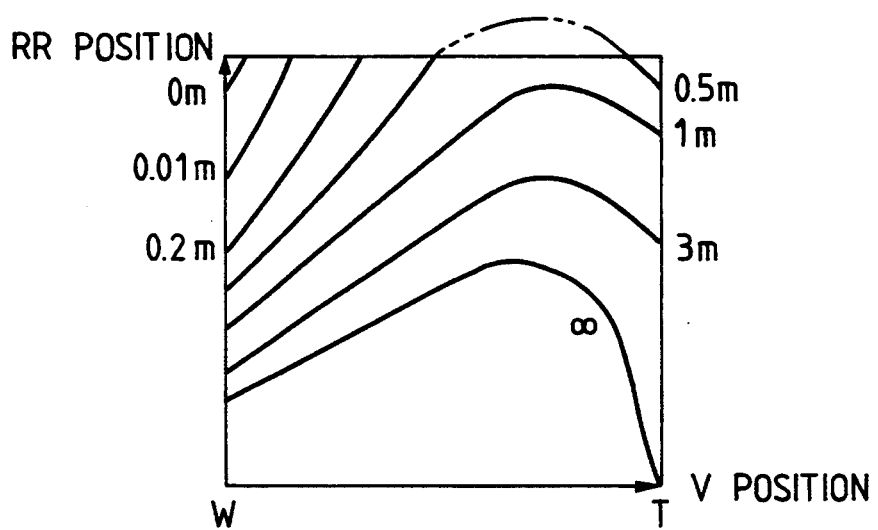
FIG. 6 is an explanatory diagram showing the optical-axis position of a focusing lens unit in a zoom lens shown in FIG. 5.

FIG. 4 is a schematic diagram showing the optical-axis positions of a lens unit which forms a zoom lens SL and moves during focusing in association with zoom positions (focal lengths) and object distance.

In FIG. 4, the x axis represents zoom positions (focal lengths), the y axis, object distance, and the z axis, optical-axis positions in which the lens unit should lie. That is to say, the z axis corresponds to the optical axis of the zoom lens. INF represents an infinite object distance, and MOD, a shortest object distance. WIDE represents a wide angle edge, and TELE, a telephotographic edge.

As shown in FIG. 4, in a zoom lens according to the present invention, the optical-axis position (z) of a lens unit changes non-linearly depending on a zoom position (x) and an object distance (y) and moves on a single curved surface as a whole. The single curved surface Sz is represented as an approximate curved surface or an approximate plane, and coefficients ($Z_{i,j}$) specifying the surface Sz are represented as positional coefficients. These values are stored in a memory as shown in FIG. 2.

In another embodiment, an approximate curved surface Sz may be handled as an approximate plane. A position Z on the optical axis of a lens unit is treated as a point on a plane Sz specified with a focal length x, an object distance y, and surface coefficients (a, b, c), and is represented by the expression below.

$$Z = ax + by + c \tag{1}$$

That is to say, the position Z may be treated as a plane (Sz) specified with the values x and y.

Herein, x is an input of a focal length setting means 1 shown in FIG. 1 and y is an input of an object distance setting means 2. A CPU 6 obtains surface coefficients a, b, and c by computing positional coefficients ($Z_{i,j}$) stored in a memory 4 as shown in FIG. 2 in association with the values x and y.

For example, as shown in FIG. 4, assuming that focal length information is $x_a$ (a value between $x_7$ and $x_8$) and object distance information is $Y_a$ (a value between $Y_2$ and $y_3$), multiple (two) positional coefficients $Z_{27}$ and $Z_{28}$ and multiple (two) positional coefficients $Z_{27}$ and $Z_{37}$ are used to calculate the focal length information $x_a$ and object distance information $y_a$ respectively according to the expressions below.

$$a = (Z_{28} - Z_{27})/(x_8 - x_7),$$

$$b = (Z_{37} - Z_{27})/(y_3 - y_2),$$

$$C = Z_{27} - ax_7 - by_2$$

Then, a CPU 6 uses these values to compute, for example, the expression (1) and thus obtains the optical-axis position (Z) of the lens unit within the plane area Sz.

A zoom lens according to the present invention may have a lens configuration in which three lens units $8a$ to $8c$ move independently during zooming, and three lens units $8a$ to $8c$ or two lens units $8a$ and $8b$, $8b$ and $8c$, or $8a$ and $8c$ of the three lens units may move independently during focusing.

In an alternative lens configuration, two lens units $8a$ and $8b$, $8b$ and $8c$, or $8a$ and $8c$ may move independently along the optical axis during zooming, and three lens units $8a$ to $8c$ or two lens units $8a$ and $8b$, $8b$ and $8c$, or $8a$ and $8c$ may move independently along the optical axis during focusing.

A zoom lens according to the present invention may also be a zoom lens made up of two or more lens units.

Figure 3:
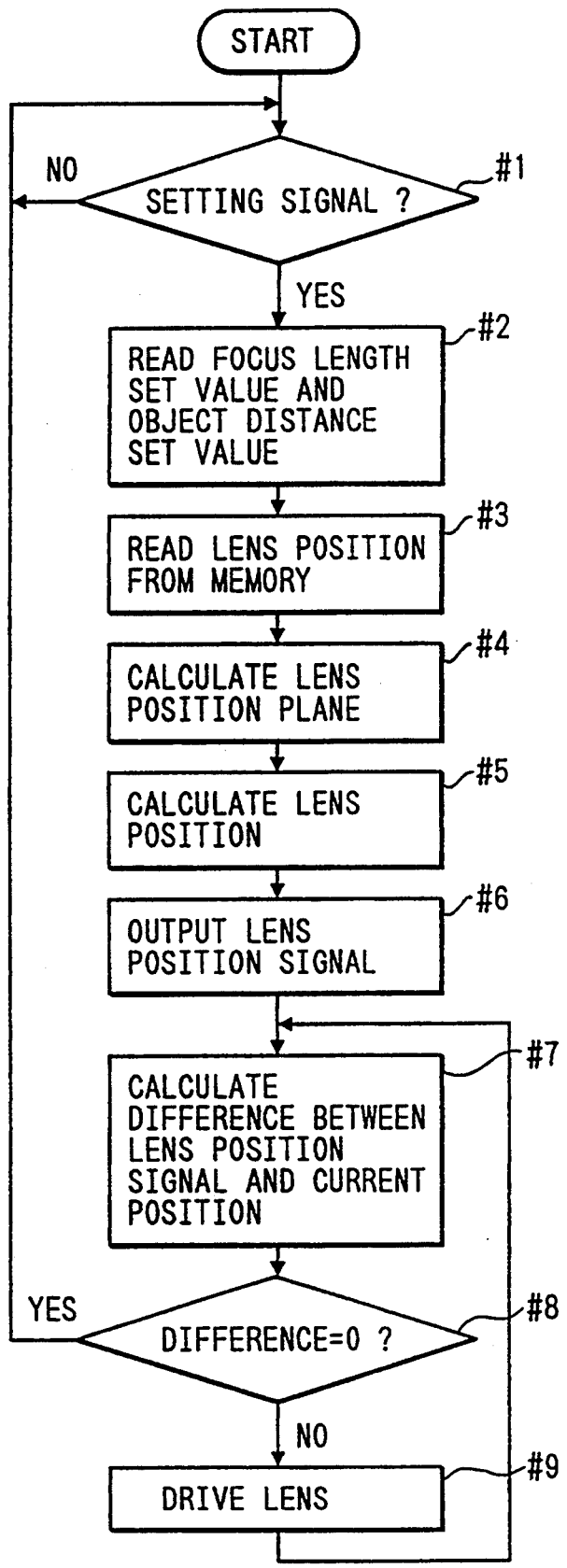
FIG. 3 is a flowchart of the first embodiment of the present invention.

Next, the operations of a camera system of this embodiment will be described in conjunction with the flowchart of FIG. 3.

At a step 1, a detector 3 detects presence of a setting signal or setting signals sent from a focal length setting means 1 and/or an object distance setting means 2. If no setting signal is found, the detector 3 waits for a setting signal. If a setting signal is found, the detector 3 outputs a set value signal ($x_a$, $y_a$) the detector 3 detects. At a step 2, a CPU 6 reads the set values $x_a$ and $y_a$ sent from the detector 3. At a step 3, the CPU 6 reads out positional coefficients ($Z_{i,j}$) relative to the set values ($x_a$, $y_a$) from a memory 4 containing positional coefficients in lens units, for example, as shown in FIG. 2.

The relationships between set values ($x_a$, $y_a$) and positional coefficients are shown in FIG. 4. Assuming that an area S1 is a plane, positional coefficients $Z_{27}$, $Z_{28}$, and $Z_{37}$ specifying the area S1 are used for all set value signals (x, y) contained in the area S1. Then, these positional coefficients $Z_{27}$, $Z_{28}$, and $Z_{37}$ are used to calculate surface coefficients (a, b, c) for the plane S1 as described previously.

$$a = (Z_{28} - Z_{27})/(x_8 - x_7),$$

$$b = (Z_{37} - Z_{27})/(y_3 - y_2),$$

$$C = Z_{27} - ax_7 - by_2$$

Then, the position Z of a lens unit is calculated by assigning the surface coefficients a, b, and c to the expression below.

$$Z = a \times x_a + b \times y_a + C \tag{2}$$

At a step 4, an expression for specifying the plane S1 representing the lens position Z is computed using positional coefficients ($Z_{i,j}$):

$$(Z = ax + by + C)$$

At a step 5, the read coefficients (a, b, c) and the read set values x and y are assigned to the aforesaid expression (2) to obtain the lens position z. At a step 6, a lens position signal z is supplied to a lens position controller 7. At a step 7, the lens position controller 7 reads out the current position of a lens unit from a position detector (10), then calculates a difference between the contents of the lens position signal and the current position. At a step 8, the difference is checked. If the difference is 0, the lens position controller 7 waits for a set value signal. If the difference is not 0, the lens position controller 7 outputs a drive signal to nullify the difference.

At a step 9, a lens driver 9 drives the lens unit. Then, control returns to step 7. The aforesaid operations are repeated until the difference becomes 0. The flowchart of FIG. 3 is concerned with a single lens unit. After step 3, the same steps of the flowchart are performed for each lens unit. A memory shown in FIG. 2 exists for each lens unit.

As shown in FIG. 4, the optical-axis position of a lens unit is represented using a curved surface. In this embodiment, the optical-axis position of a lens unit is approximated using a plane. However, it will be readily appreciated that a position z may be approximated using a quadric or other curved surface. The surface coefficients are calculated using positional coefficients stored in a memory. Then, similarly to the aforesaid embodiment, the position Z of the lens unit may be calculated. This also provides the same effects as the aforesaid embodiment.

In this embodiment, the positions of lens units are stored in association with object distances and focal lengths. However, the positions of each lens unit may also be stored either in association with object distances and positions of other lens units or focal lengths and positions of other lens units. This variant also provides the same effects as the aforesaid embodiment.

In the aforesaid embodiment, coefficients specifying a surface are obtained by computation. However, coefficients, each pair providing the position of a lens unit as a solution and comprising variables of a focal length and an object distance, may be contained in a table as shown in FIG. 2.

Next, an embodiment or a variant of the aforesaid lens position control apparatus will be described. In the previous embodiment, a drive control means drives lens units so that the lens units will move to computed lens unit positions precisely. In reality, when an attempt is made to control a lens unit precisely, the lens unit may overshoot depending on the moving speed. This causes the image surface to shift. Thus, it is very difficult to have lens units follow a command issued from the drive control means. In an embodiment described next, this problem is solved and variation in the position of image formation is minimized.

FIG. 7 is a schematic diagram of the main section of another embodiment of a camera system according to the present invention. In FIG. 7, SL denotes a zoom lens body, and CA, a camera body. The zoom lens SL has three lens units $8a$, $8b$, and $8c$. During zooming or focusing, at least two of three lens units $8a$ to $8c$ move along the optical axis while maintaining a certain relationship.

$10a$ to $10c$ are position detectors, which detect the optical-axis positions of the lens units $8a$ to $8c$ and supply the positional information to positional error calculators $11a$ and $11b$ or a lens position controller $7c$. The positional error calculators $11a$ and $11b$ calculate differences (positional errors) between the optical-axis positions of the lens units an arithmetic logic calculator 6 provides and the actual optical-axis positions of the lens units the position detectors $10a$ to $10c$ detect. Then the calculated values are inputted to a compensation value calculator 12. $9a$ to $9c$ are lens drivers for driving the lens units $8a$ to $8c$ according to drive signals sent from lens position controllers $7a$ to $7c$. The lens position controllers $7a$ to $7c$ are provided with positional information or the optical-axis positions of the lens units by the arithmetic logic calculator 6.

12 denotes a compensation value calculator, which uses output signals of positional error calculators $11a$ and $11b$ to calculate the optical-axis position of a lens unit $8c$ for compensating for an image formation positional error deriving from positional errors of lens units $8a$ and $8b$, and then inputs the result of the calculation into a lens position controller $7c$.

In FIG. 7, a lens unit $8c$ is moved to compensate for an image formation positional error. However, other lens units could be used.

FIG. 2 is an explanatory diagram of coefficients ($a_{i,j}$, $b_{i,j}$, $c_{i,j}$) stored in a memory 4. As shown in FIG. 2, the x axis represents focal lengths (zoom positions), and the y axis, object distances. This helps compute an expression, to be described later, which has focal length and object distance are variables and thus obtain the optical-axis position of each lens unit. Then, the memory 4 is divided into multiple areas in both the x and y directions to contain coefficients in areas. 5 denotes a ROM containing programs.

A CPU 6 retrieves focal length information and object distance information from a detector 3 and predetermined coefficients from the memory 4. The CPU 6 executes a program 5 using these values and thereby calculates the optical-axis positions of lens units $8a$ to $8c$. Then, the CPU 6 inputs the results of the calculation into lens position controllers $7a$ to $7c$. The lens position controllers $7a$ to $7c$ control drive of drivers $9a$ to $9c$ and thus move the lens units $8a$ to $8c$ along the optical axis.

At this time, as described previously, position detectors $10a$ and $10b$ detect the optical-axis positions of lens units $8a$ and $8b$, then provide positional error calculators $11a$ and $11b$ with the detected positions. The positional error calculators $11a$ and $11b$ calculate differences between the detected positions and the input values an arithmetic logic calculator 6 provides, then provide a compensation value calculator 12 with the results. The compensation value calculator 12 uses the resultant values, calculates the paraxial refracting power arrangement or sensitivity of each lens unit, and thus obtains an image formation positional error. Then, the compensation value calculator 12 obtains the optical-axis position of a lens unit $8c$ for compensating for the image formation positional error by calculating, for example, the sensitivity, and then inputs the signal to the lens position controller $7c$.

The lens position controller $7c$ controls a driver $9c$ in response to a signal sent from a compensation value calculator 12 and thus moves the lens unit $8c$ along the optical axis. Thereby, the lens units $8a$ to $8c$ forming the zoom lens are driven and controlled with high precision according to input information entered at a focal length setting means 1 and an object distance setting means 2. This permits production of high-quality images.

In this embodiment, a compensation lens unit is a lens unit which is moved during focusing and has the smallest sensitivity (ratio of the variation of an image surface to the movement of a lens unit) among all lens units.

Figure 9:
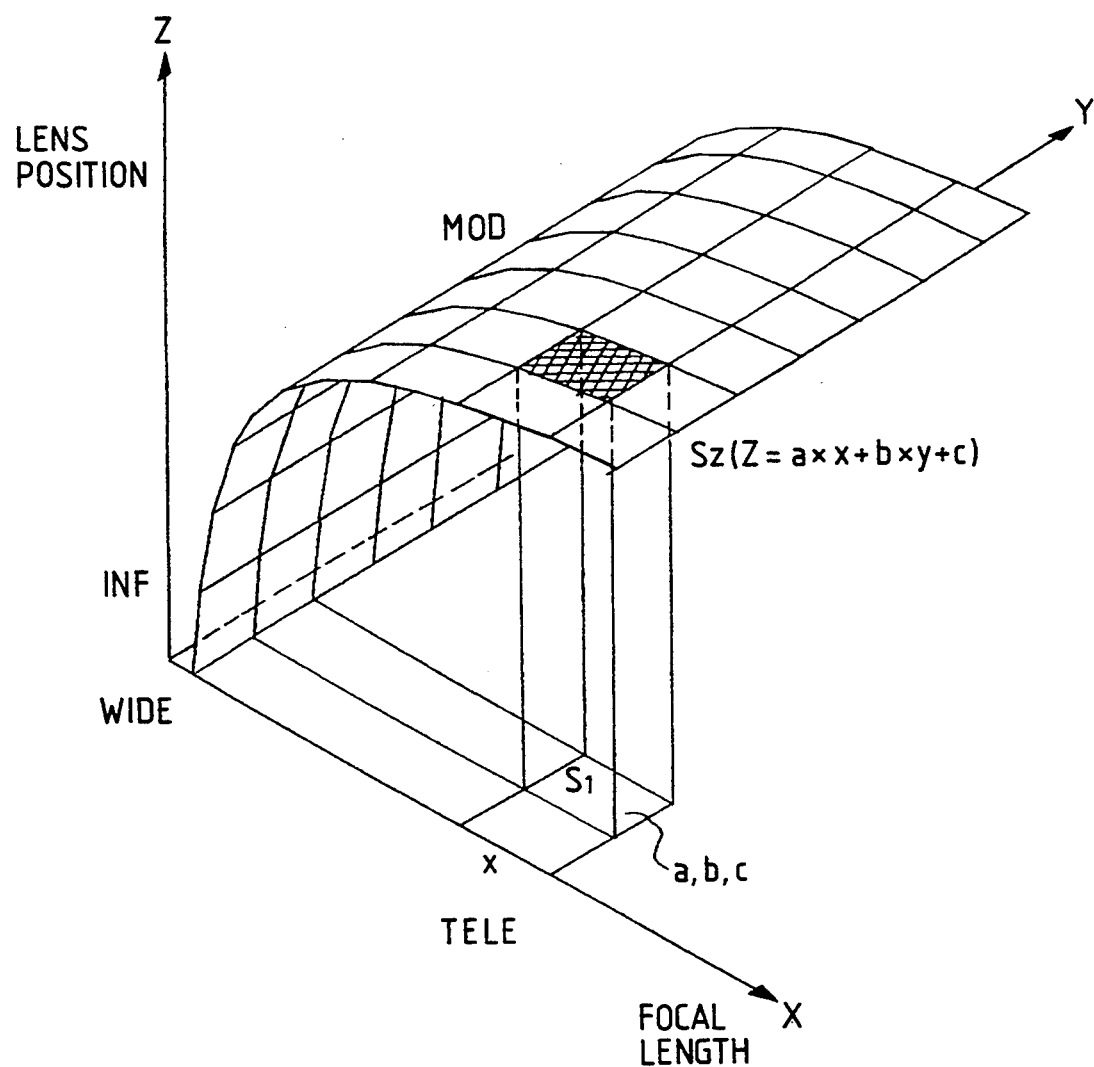
FIG. 9 is an explanatory diagram showing the optical-axis positions of a lens unit in association with object distances and focal lengths.

FIG. 9 is a schematic diagram showing the optical-axis positions of a lens unit, which constitutes a zoom lens SL and moves during focusing, in association with zoom positions (focal lengths) and object distances.

As shown in FIG. 9, in a zoom lens according to the present invention, the optical-axis position (z) of a lens unit changes non-linearly, depending on a zoom position (x) and an object distance (y), or moves on a single curved surface as a whole. Then, the single curved surface Sz is represented as an approximate curved surface and the coefficients specifying the surface are stored as positional coefficients (a, b, c) in a memory 4.

In another embodiment, an approximate curved surface Sz may be treated as an approximate plane for convenience sake. The optical-axis position Z of a lens unit can be treated as a point on a plane Sz specified with a focal length x, an object distance y, and coefficients (a, b, c), and represented as the expression below.

$$Z = ax + by + c$$

That is to say, the optical-axis position Z may be represented as a position plane (Sz) specified with values x and y.

Herein, x is entered at a focal length setting means 1 shown in FIG. 1, and y, at an object distance setting means 2. Coefficients (a, b, c) are selected from an area in a memory 4 according to the values x and y as shown in FIG. 2. A CPU 6 uses these values to compute, for example, the expression (1) and thus obtains the optical-axis position (z) of a lens unit within the plane area Sz.

Next, the operations of this embodiment will be described in conjunction with the flowchart of FIG. 10.

Figure 10:
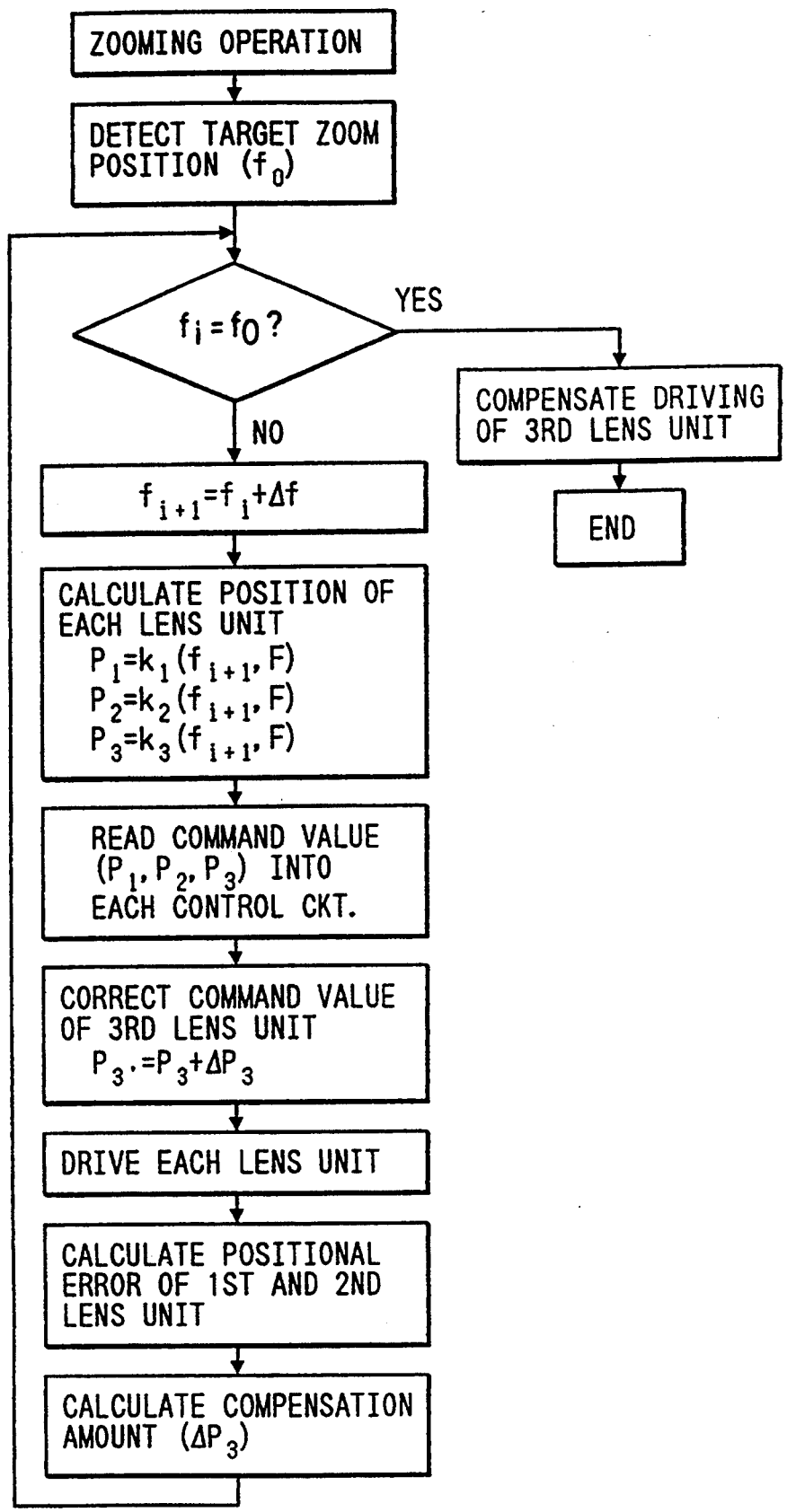
FIG. 10 is a flowchart of an embodiment of the present invention.

FIG. 10 shows the processing sequence of a zooming operation executed at a focal length setting means 1. The processing sequence also applies to focusing.

In a zooming operation, a focal length setting means 1 inputs focal length information or a target zoom position $f_0$. A detector 3 detects the target zoom position $f_0$, then compares it with a current zoom position $f_i$. If the current zoom position $f_i$ has not reached the target zoom position $f_0$, the current zoom position $f_i$ is advanced by one step $\Delta f$ according to the expression below.

$$f_{i+1} = f_i + \Delta f$$

Then, an arithmetic logic calculator 6 uses values stored in a memory 4 to calculate the optical-axis position P1 of a first movable lens unit 8a for the zoom position $f_{i+1}$. Similarly, the optical-axis positions P2 and P3 of second and third movable lens units 8a and 8c are calculated. The position of each movable lens unit is uniquely determined with two variables of a zoom position f and a focus position F.

Figure 11:
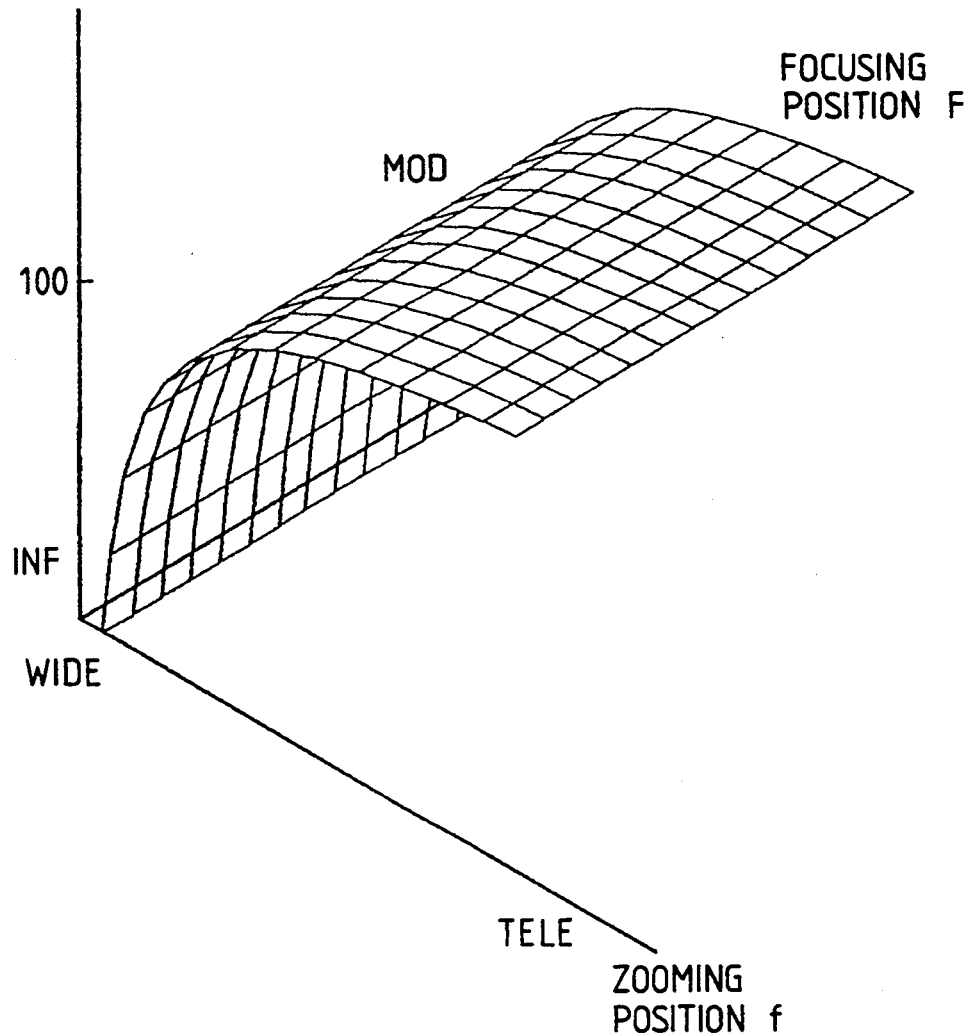
FIG. 11 is an explanatory diagram showing the optical-axis position of a lens unit 8a of an embodiment of the present invention.
Figure 12:
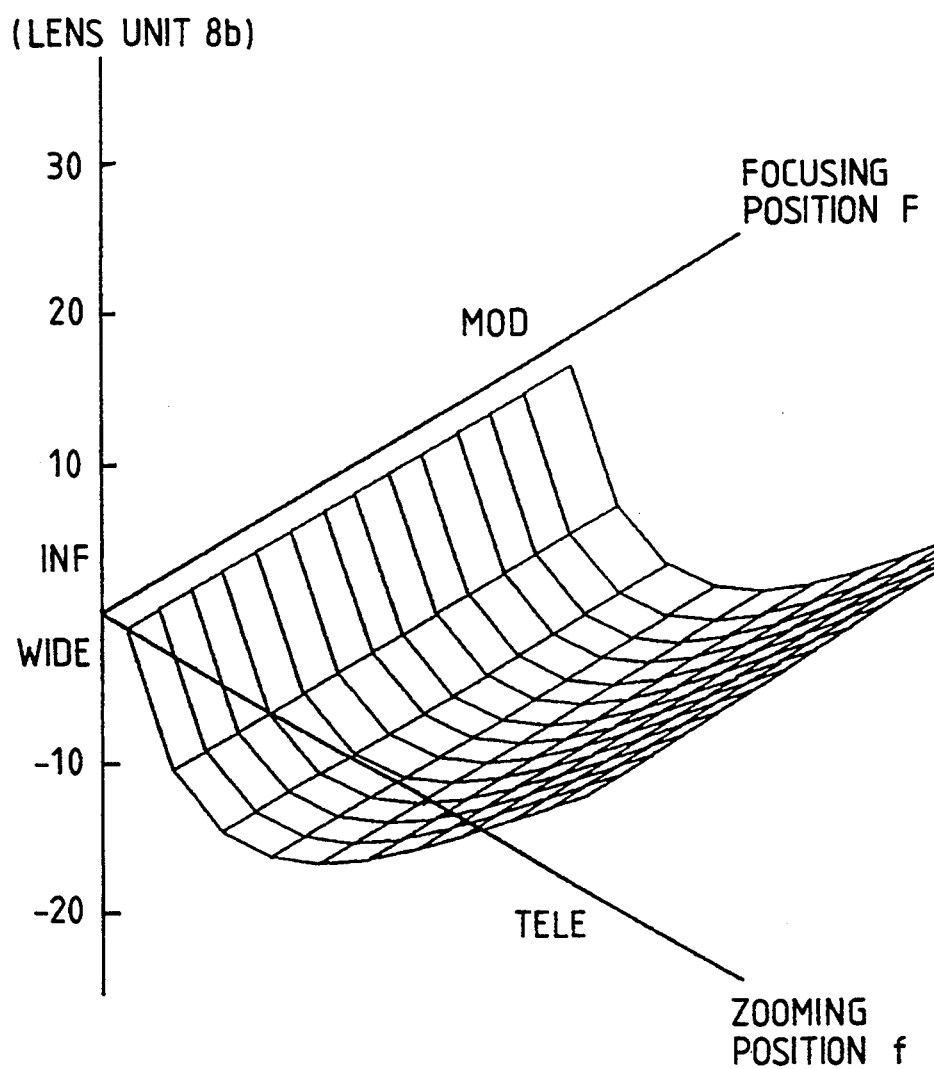
FIG. 12 is an explanatory diagram showing the optical-axis position of a lens unit 8b of an embodiment of the present invention.
Figure 13:
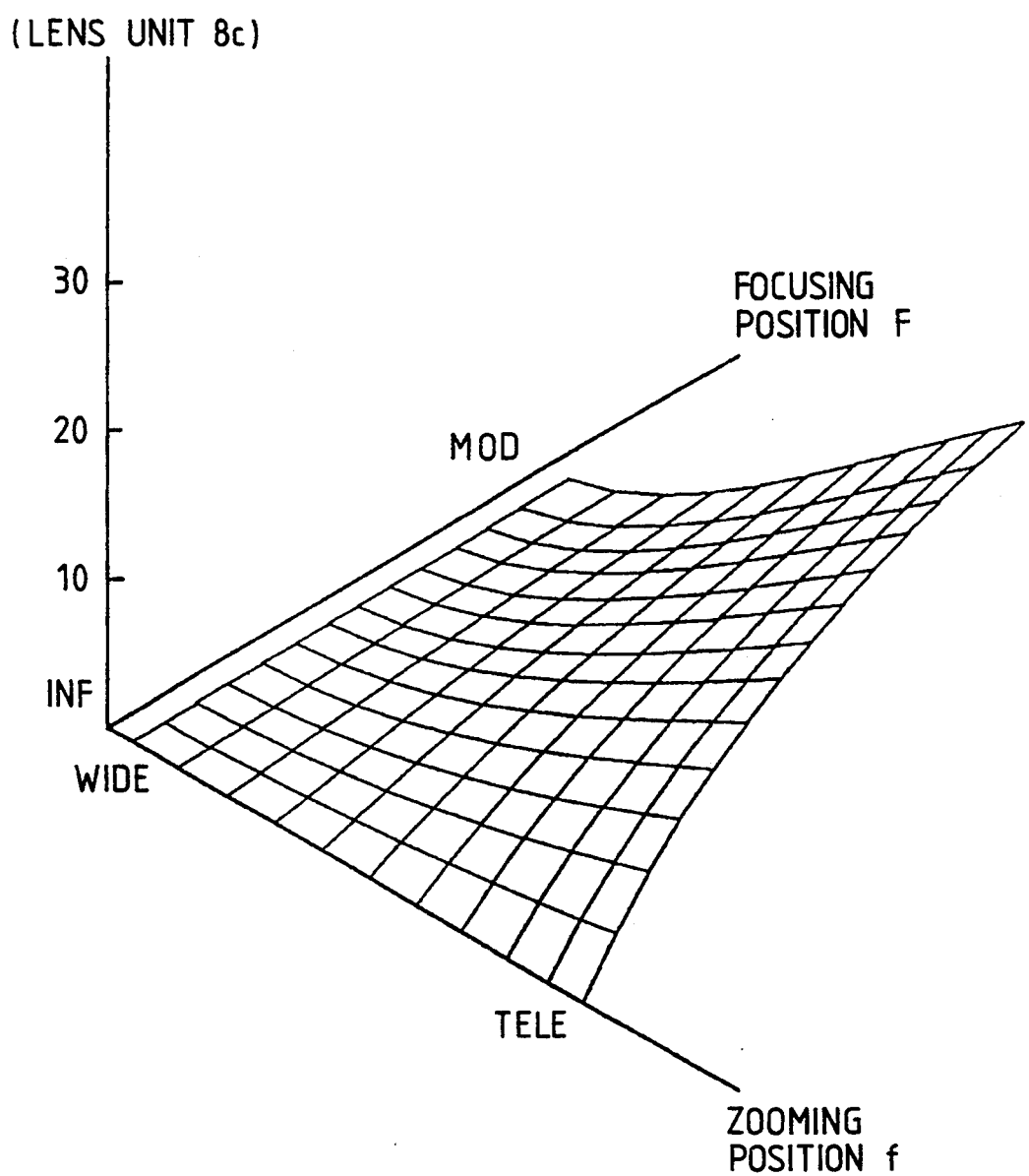
FIG. 13 is an explanatory diagram showing the optical-axis position of a lens unit 8c of an embodiment of the present invention.

For example, similarly to the lens unit represented in FIG. 9, the lens units 8a to 8c are represented as curved surfaces in FIGS. 11 to 13. The aforesaid expression is computed to obtain the optical-axis positions P1, P2, and P3 of the movable lens units 8a and 8c as points on these curved surfaces.

Next, the optical-axis positions P1, P2, and P3 of the movable lens units are read into lens position controllers 7a to 7c. For the third movable lens unit 8c, an output $\Delta P3$ of a compensation value calculator 12 is compensated P3. Specifically, $\Delta P3$ is added to P3, resulting in P'3. However, since $\Delta p3 = 0$ for the first zooming, compensation is not done.

Next, the lens position controllers 7a to 7c drive drivers to move the movable lens units. At this time, widely-adopted position servomotors are employed. When position servomotors are driven, positional errors may occur.

When control-related positional errors occur, even if an arithmetic logic calculator outputs command values P1, P2, and P3 precisely, the lens units may overshoot. Therefore, the image formation position of a zoom lens becomes incorrect. This results in a focal shift. Then, compensation for the image formation positional error resulting from control positional errors of the first movable lens unit 8a and the second movable lens unit 8b is effected by using the third movable lens unit 8c having the smallest sensitivity.

A compensation value calculator 12 calculates a compensation value. Assume that the control positional errors of the first movable lens unit 8a and the second movable lens unit 8b are $\delta 1$ and $\delta 2$ respectively. When the sensitivities of the movable lens units to an image formation position are $\alpha 1$, $\alpha 2$, and $\alpha 3$ respectively, the compensation value $\Delta P3$ for the third movable lens unit 8c is represented as follows:

$$\Delta P3 = (\alpha 1 \times \delta 1 + \alpha 2 \times \delta 2)/\alpha 3$$

When the compensation value $\Delta P3$ becomes smaller than a certain value or, for example, a permissible image formation positional error, compensation is not performed. That is to say, $\Delta P3$ is set to 0. The compensation value $\Delta P3$ is added to the lens position P3 at the first step in the next zooming, thus compensating for an image formation positional error.

Figure 14:
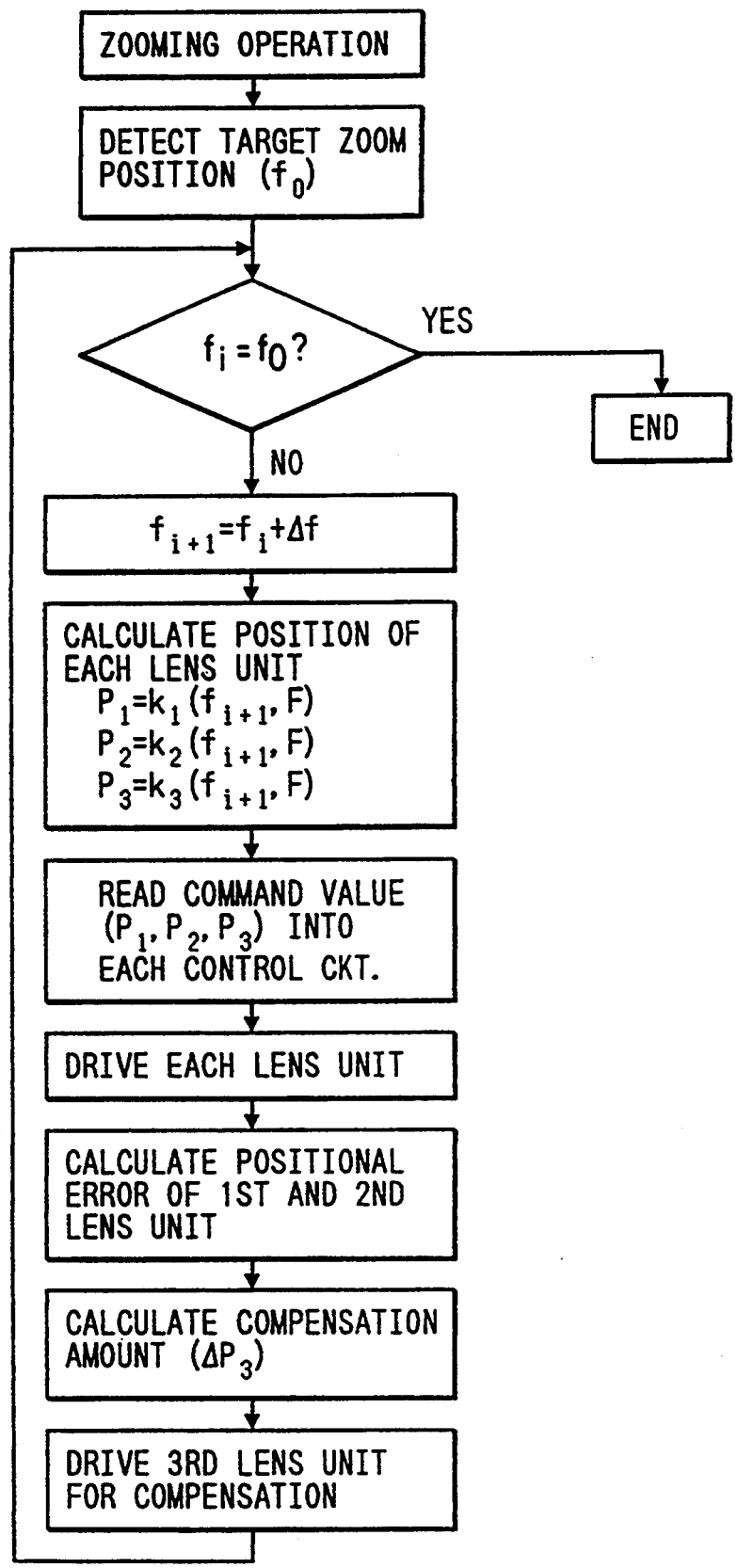
FIG. 14 is other flowchart of an embodiment of the present invention.

In this embodiment, as shown in the flowchart of FIG. 14, after movable lens units are driven, a compensation value for the third movable lens unit 8c is calculated. Then, compensation may apply immediately.

After the operations of the first step are complete, control returns to the start address. Then, it is checked whether the current zoom position has reached a target zoom position $f_0$. If it has not, the aforesaid operations are repeated until the current zoom position reaches the target zoom position $f_0$.

Thus, an image formation positional error attributable to the control position errors of the first and second movable lens units is compensated for using the third movable lens. Thus, a focal shift derived from zooming is minimized. In this embodiment, the minimization can be attained merely by installing a compensation value calculator. Therefore, control system will not become complex but the lightweight and compact.

Figure 16:
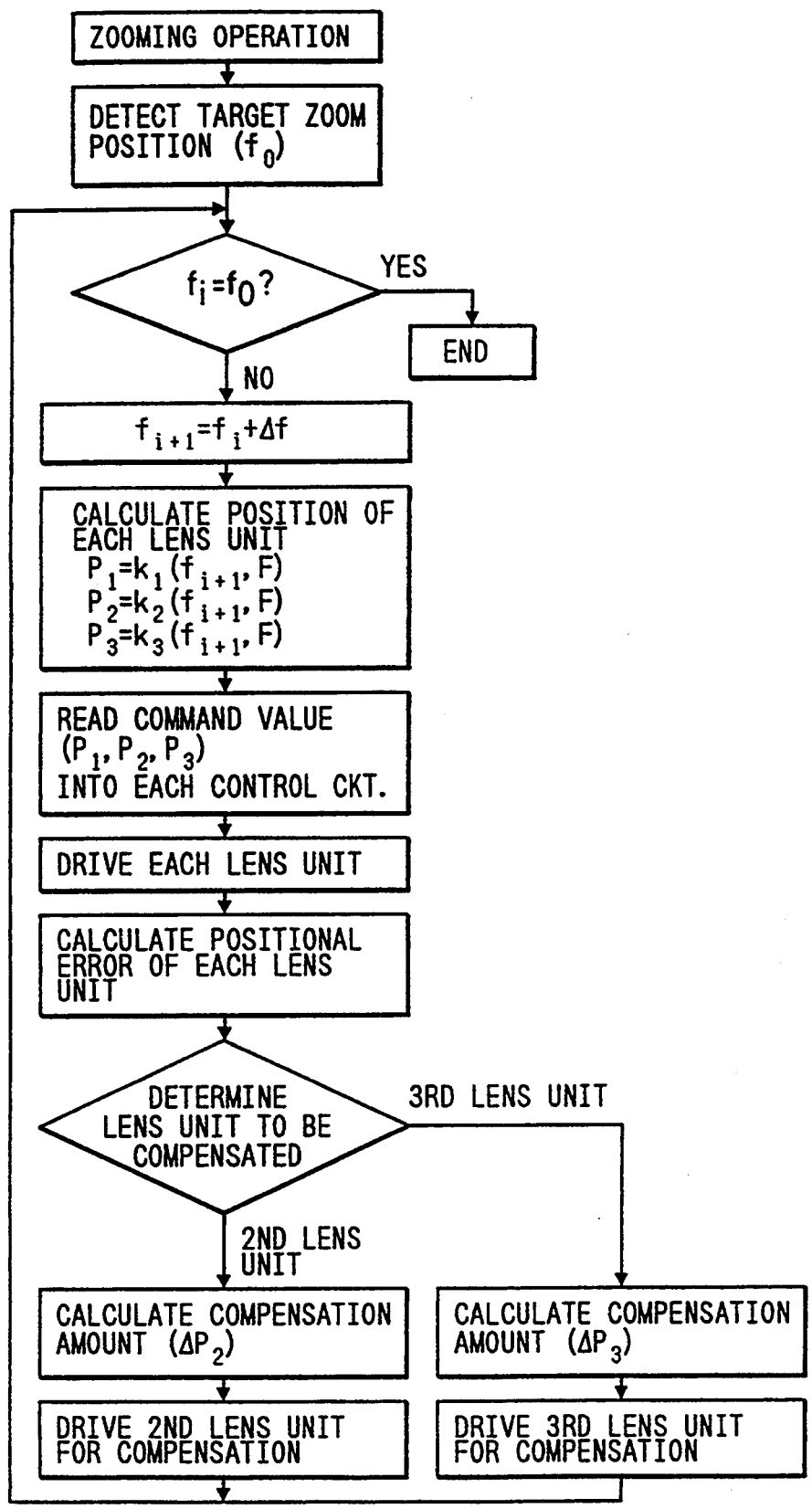
FIG. 16 is a flowchart of an embodiment of the present invention.

Next, another embodiment will be described in conjunction with FIGS. 15 to 17. Components assigned the same symbols as those in the previous embodiments will not be described.

In FIG. 15, 13 denotes a selector, which interprets a signal sent from an arithmetic logic calculator 6 and selects a lens unit used to compensate for an image formation positional error and most suitable for the zoom position from among multiple lens units 8a to 8c.

When the selector 13 selects a lens unit according to a signal sent from an arithmetic logic calculator 6, a criterion adopted in this embodiment is that the lens unit is movable during focusing and has the smallest sensitivity at a zoom position at which an image formation positional error is to be compensated for.

Alternatively, positional information sent from position detectors 10a to 10c is processed to obtain a current zoom position, then information in a memory 4 containing sensitivities in zoom positions is referenced to select a lens unit having the smallest sensitivity.

12 denotes a compensation value calculator. The compensation value calculator uses output signals of positional error calculators 11a, 11b, and 11c to calculate the optical-axis position of a lens unit a selector 13 has selected to compensate for an image information positional error deriving from positional errors of lens units 8a, 8b, and 8c, and then provides lens position controllers with the results of the calculation.

In FIG. 15, a selector 13 selects a lens unit 8b or a lens unit 8c, and moves the lens unit 8b or lens unit 8c to compensate for an image formation positional error. Lens unit 8a may also be employed for compensation. Alternatively, two lens units may be picked up and moved at a certain ratio.

Positional error calculators 11a, 11b, and 11c calculate differences from values an arithmetic logic calculator 6 inputs, and then provide a compensation value calculator 12 with the results of the calculation. The compensation value calculator 12 interprets the calculated values to obtain an image formation positional error using the paraxial refracting power arrangements and sensitivities of lens units, calculates the optical-axis positions of a lens unit (in this embodiment, a lens unit 8b or a lens unit 8c) a selector 13 has selected to compensate for the image formation positional error using, for example, the sensitivity, then inputs the signal to a lens position controller 7b or 7c.

In response to a signal sent from the compensation value calculator 12, the lens position controller 7b or 7c controls a driver 9b or 9c to move the lens unit 8b or 8c along the optical axis. Thus, the lens units 8a to 8c forming a zoom lens are driven and controlled with a high degree of precision according to input information entered at a focal length setting means 1 and an object distance setting means 2. This permits production of high-quality images.

The operations of this embodiment will be described in conjunction with the flowchart of FIG. 16.

In a zooming operation, focal length information or a target zoom position $f_0$ is entered at a focal length setting means 1. A detector 3 detects the target zoom position $f_0$, then compares a current zoom position $f_i$ with the target zoom position $f_0$. If the current zoom position has not reached the target zoom position $f_0$, the current zoom position $f_i$ is advanced by one step $\Delta f$ according to the following expression:

$$f_{i+1} = f_i + \Delta f$$

An arithmetic logic calculator 6 uses values existing in a memory 4 to calculate the optical-axis position P1 of a first movable lens unit 8a for a zoom position $f_{i+1}$. Similarly, the optical-axis positions P2 and P3 of a second lens unit 8b and a third lens unit 8c are calculated. The position of each movable lens unit is uniquely determined with two variables of a zoom position f and a focus position F.

As described previously, the optical-axis positions P1, P2, and P3 of movable lens units 8a to 8c are calculated according to a plane equation described previously. Next, the positions P1, P2, and P3 of the movable lens units are read into lens position controllers 7a to 7c.

Then, the lens position controllers 7a to 7c controls drivers to drive the movable lens units. At this time, widely-adopted position servomotors are employed. When the position servomotors are driven, certain positional errors may occur.

When control-related positional errors occur, even if an arithmetic logic calculator 6 outputs command values P1, P2 and P3 precisely, the image formation position of a zoom lens becomes incorrect. This causes a focus shift.

In this embodiment, an image formation positional error attributable to control positional errors of lens units is compensated for by using a single lens unit selected by selector 13.

The selector 13 selects a lens unit which is movable during focusing and has the smallest sensitivity at a zoom position, then uses the lens unit as a compensation lens unit.

For example, sensitivities of lens units to an image formation position are stored in zoom positions in a memory 4. A lens unit having the smallest sensitivity at a zoom position is retrieved from the memory 4.

A compensation value calculator 12 calculates a compensation value $\Delta P$ for compensation using a selected lens unit.

Assume that the sensitivities of the first, second, and third lens units at a zoom position are $\alpha 1$, $\alpha 2$, and $\alpha 3$ respectively and the compensation values are $\Delta P1$, $\Delta P2$, and $\Delta P3$ respectively. When the selector 13 selects the second lens unit, the compensation value $\Delta P2$ is given as follows:

$$\Delta P2 = -(\alpha 1 \times \Delta P1 + \alpha 3 \times \Delta P3)/\alpha 2$$

When the third lens unit is selected, the compensation value $\Delta P3$ is given as follows:

$$\Delta P3 = -(\alpha 1 \times \Delta P1 + \alpha 2 \times \Delta P2)/\alpha 3$$

In this embodiment, both the second and third lens units may be selected and moved at a certain ratio to achieve compensation.

Then, when the compensation value $\Delta P$ becomes smaller than a certain value or, for example, a permissible image formation positional error, compensation is terminated.

Figure 17:
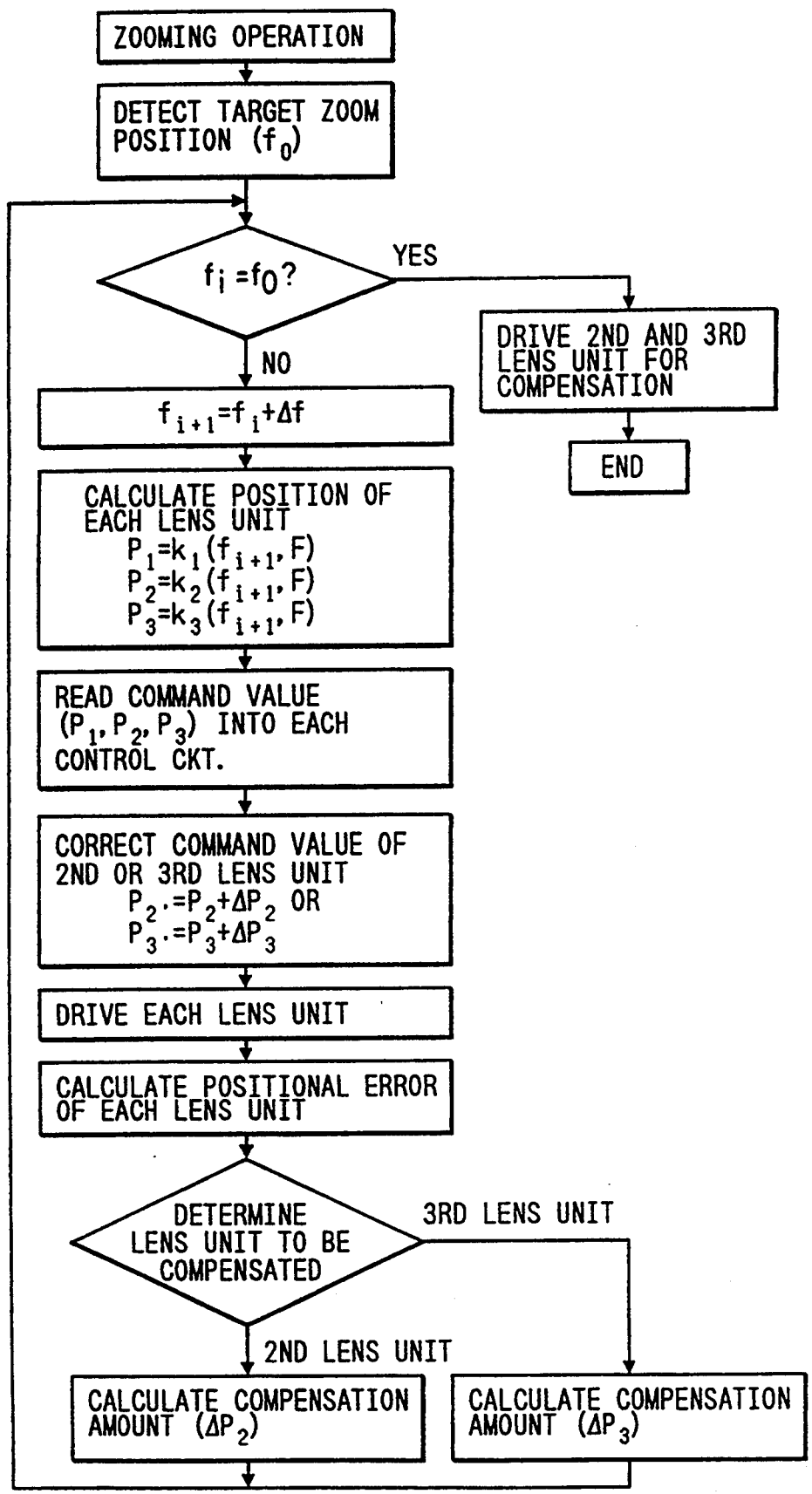
FIG. 17 is other flowchart of an embodiment of the present invention.

In this embodiment, as shown in the flowchart of FIG. 17, after a compensation value calculator calculates a compensation value for compensating for an image formation positional error occurring with movement of lens units, compensation may not be done immediately but the compensation value may be added to a lens position at the next step of driving.

Thus, the operations of the first step are complete. Then, control returns to the start address. Then, it is checked whether a current zoom position has reached the target zoom position $f_0$. The above operations are repeated until the current zoom position reaches the target zoom position $f_0$.

Thus, in this embodiment, an image formation positional error deriving from control positional errors of movable lens units is compensated for using a lens unit suitable for the zoom position. This helps minimize a focus shift resulting from zooming. In this embodiment, for structural reasons, the minimization can be attained merely by installing a selector and a compensation value calculator. Therefore, the control system will not be complex, but lightweight and compact.

Next, an embodiment with further modifications will be described in conjunction with FIG. 21.

Figure 21:
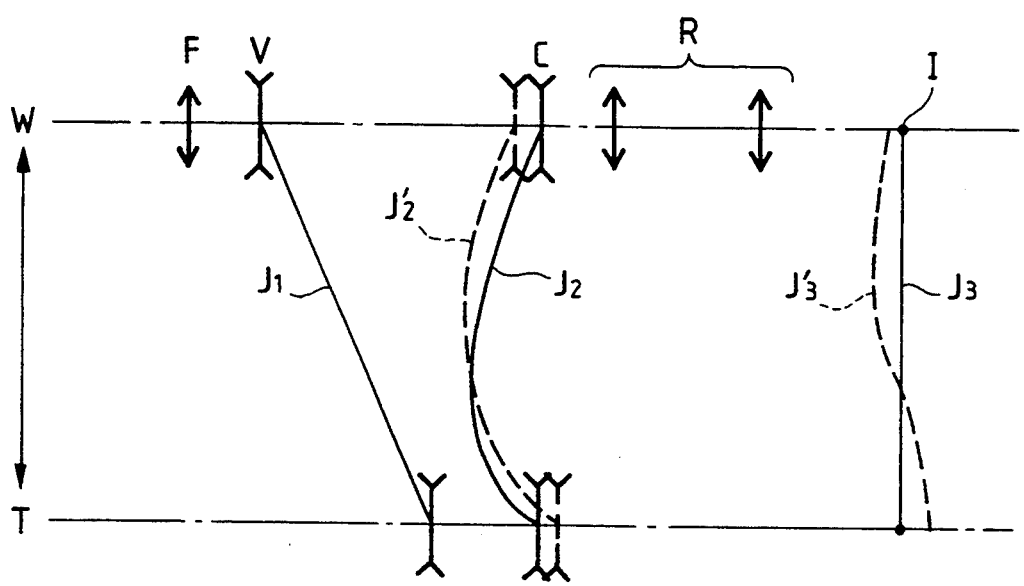
FIG. 21 is an explanatory diagram for explaining paraxial refracting power arrangement in a general four-unit zoom lens.

In FIG. 21, I indicates an image point of an entire lens system. A second lens unit V moves along a real line $J_1$ in zoom mode in which the entire lens system reciprocates between a wide angle edge (W) and a telephotographic edge (T). Interlocked with the second lens unit V, a third lens unit C moves along a real line $J_2$. At this time, the image point I is stationary during zooming. As a result, the image point is positioned on a straight line $J_3$; that is, a photosensitive surface. The orbits of the second lens unit V and the third lens unit C correspond to cam grooves formed on cam rings. The relative positions of four lens units are adjusted at a reference focal length (for example, W). Thus, a zoom lens is configured.

If cam grooves for moving lens units for zooming are manufactured incorrectly, the relative positions of moving lens units (third lens unit C and second lens unit V) in the optical-axis direction deviate from the ideal design positions. If the deviation is constant during zooming, the relative positions of the cam grooves and lens units should be corrected by the deviation amount. Thus, the deviation can be compensated for and a focus position is stabilized during zooming.

However, if the orbit of the third lens unit C changes to dash line $J'_2$ or if the deviation in the relative positions of the third lens unit C and the second lens unit V varies during zooming, the position of the image point I cannot be kept stationary during zooming but varies as indicated by dashed line $J'_3$. Since the deviation in the relative positions varies during zooming, the value to be compensated for changes during zooming. The compensation value must vary depending on a zoom position. Otherwise, an image surface cannot be held at a constant position. In general, it is very difficult to achieve this kind of compensation mechanically or by using cams.

Similar problems occur with manufacturing errors in focal lengths of lens units forming a zoom lens. A manufacturing error in the focal length of the first lens unit F or the fourth lens unit R, which are stationary during zooming, can be compensated for by correcting the relative positions of these lens units. Thus, focus position can be stabilized during zooming.

However, if there is a manufacturing error in the focal length of the second lens unit V or the third lens unit C which are movable during zooming, since a value for correcting the relative positions of these lens units varies during zooming, it is very difficult to compensate for manufacturing error.

Particularly in high-definition TV cameras and other high-performance cameras currently on the market, zoom lenses must be able to minimize variation in focus position due to zooming. To cope with this requirement, the relative positions of lens units which move during zooming must be restricted tightly. It is very difficult to achieve this restriction using conventional mechanical control using cams. With the mechanical control, even manufacturing errors of individual zoom lenses cannot be corrected. Next, an embodiment of the present invention for solving these problems will be described.

Figure 18:
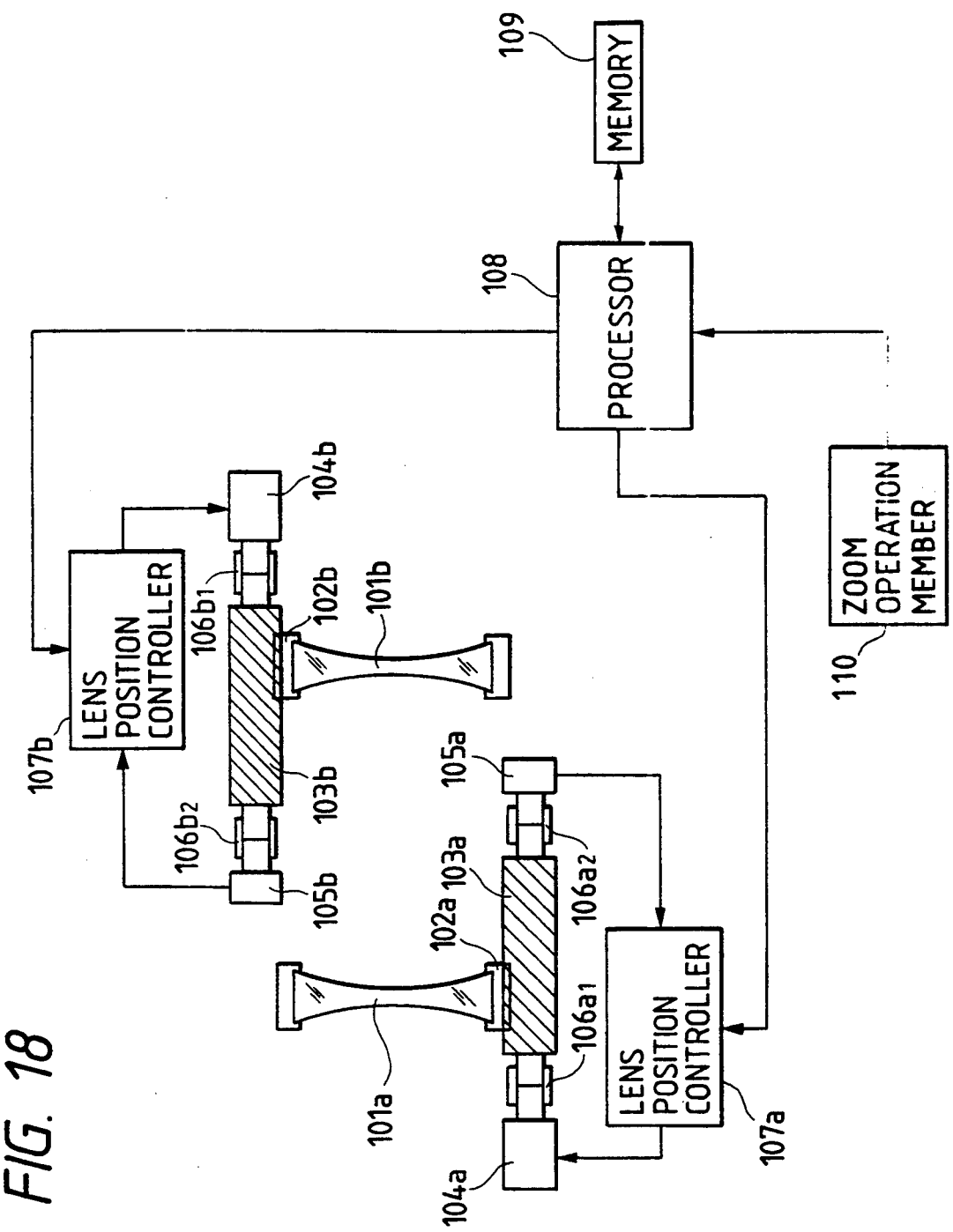
FIG. 18 is a schematic diagram of the main section of an embodiment of the present invention.
Figure 19:
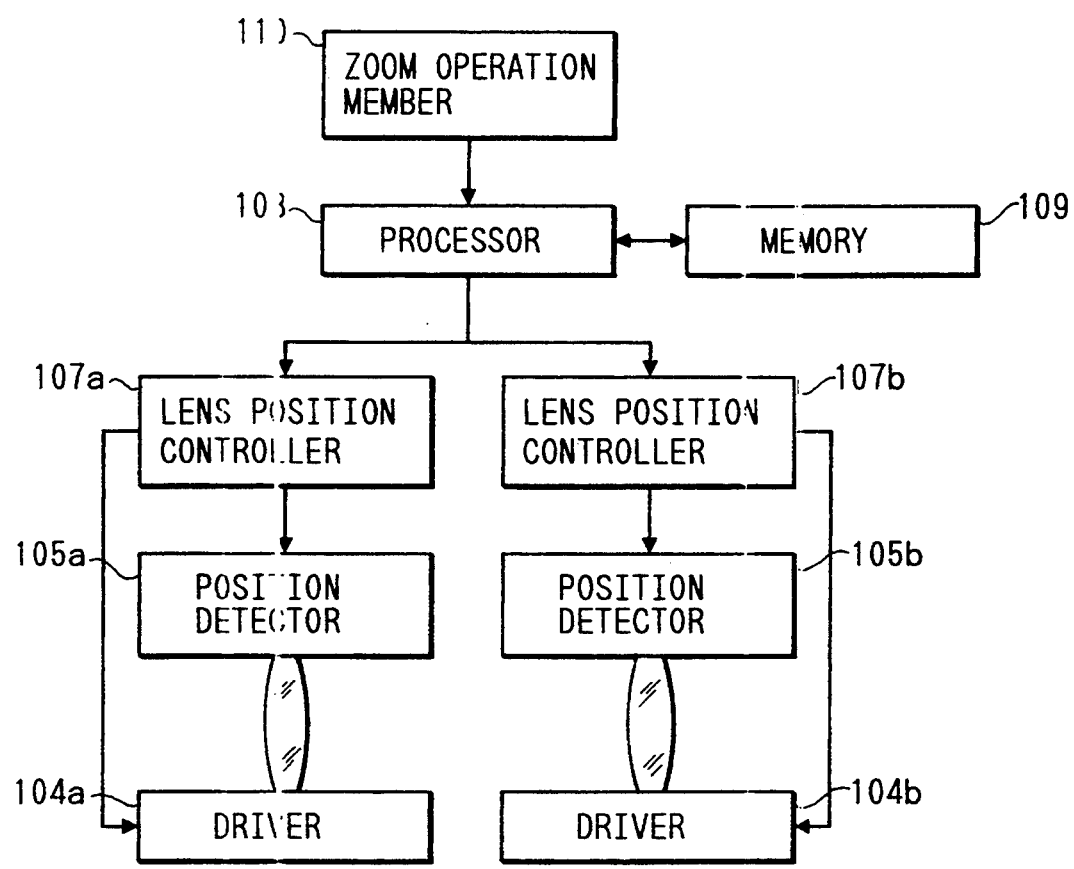
FIG. 19 is a block diagram of the main section of FIG. 18.

FIG. 18 is a schematic diagram showing the main section of an embodiment of the present invention. FIG. 19 is a block diagram of the main section of FIG. 18. In FIGS. 18 and 19, 101a and 101b denote lens units which move during zooming. The lens unit 101a is, for example, a zooming lens unit. The lens unit 101b is, for example, a compensation lens unit for correcting an image surface fluctuated during zooming.

The lens unit 101a (101b) is incorporated in a lens barrel 102a (102b) having a screw thread over the outer surface. The lens barrel 102a (102b) is configured to reciprocate rectilinearly along the optical axis of the lens unit, which is not shown. The screw thread of the lens barrel 102a (102b) is engaged with the screw thread of a rectilinear gear 103a (103b). When the rectilinear gear 103a (103b) rotates, the lens unit 101a (101b) moves along the optical axis. On one end, the rectilinear gear 103a (103b) is directly coupled to a rotation axis of a motor 104a (104b) serving as a drive via a coupling member 106a1 (106b1). On the other end, the rectilinear gear 103a (103b) is directly coupled to a rotation axis of a potentiometer 105a (105b, serving as a position detector via a coupling member 106a2 (106b2).

110 denotes a zooming operation member, which outputs zoom position information for use in moving the lens units 101a and 101b to a processor 108 according to entered zoom position information. The zooming operation member 110 is, for example, a potentiometer which has position marks in one-to-one correspondence with focal lengths and outputs a focal length as zoom position information. 109 is a memory containing operation expressions for calculating positional information (for example, a relative position from a wide angle edge or other reference position) of the moving lens units 101a and 101b in the form of programs.

Specifically, the memory 109 contains operation programs which the processor 108 executes to calculate the positional information of the lens units 101a and 101b during zooming. Included in the operation programs is an operation program for calculating positional information of a lens unit used to compensate for a focal deviation due to zooming, for processing focal deviations due to zooming which are actually measured for each zoom lens using a chart in the process of manufacturing, and for calculating positional information of a lens unit for use in compensating a focal deviation.

The memory 109 may contain a correspondence table indicating the relationships between the optical-axis positions of lens units and zoom positions instead of the foregoing program, so that an optical-axis position of a lens unit can be extracted with zoom position information.

A processor 108 uses zoom position information entered at a zooming operation member 110 and an operation program stored in the memory 109 to calculate the optical-axis positions of lens units. The processor 108 is principally composed of a CPU.

107a and 107b are lens position controllers. The lens position controllers 107a and 107b uses drivers 104a and 104b to control the optical-axis positions of lens units according to the optical-axis positions of lens units the processor 108 calculates and the optical-axis positions position detectors 105a and 105b indicate.

Herein, the operations will be described using a lens unit 101a. An operator of a zoom lens enters zoom position information at a zooming operation member 110. Then, the zooming operation member 110 inputs the zoom position information including a focal length to a processor 108. The processor 108 receives the zoom position information, executes an operation program existing in a memory 109 to calculate the optical-axis position of the lens unit 101a, and then inputs the positional information to a lens position controller 107a.

On the other hand, the rotation angles of a rectilinear gear 103a are in one-to-one correspondence with movements of the lens unit 101a. A potentiometer 105a serving as a position detector for the lens unit 101a provides the lens position controller 107a with positional information or a voltage corresponding to a rotation angle of the rectilinear gear 103a. The lens position controller 107a converts the signal (voltage) sent from the position detector 105a into positional information of the lens unit. Then, the positional information is compared with positional information specifying the optical-axis position of the lens unit 101a which the position detector 105a provides, and the difference is calculated. If the difference of the two sets of positional information is not 0 (or substantially 0), the lens position controller 107a supplies power to a motor 104a, and thus drives the lens unit 101a via the rectilinear gear 103a coupled to the motor 104a. Then, the optical-axis position of the lens unit is changed so that the difference between the two sets of positional information will be 0. Similarly, the optical-axis position of a lens unit 101b is changed depending on the manipulation of the zooming operation member 110.

Figure 20:
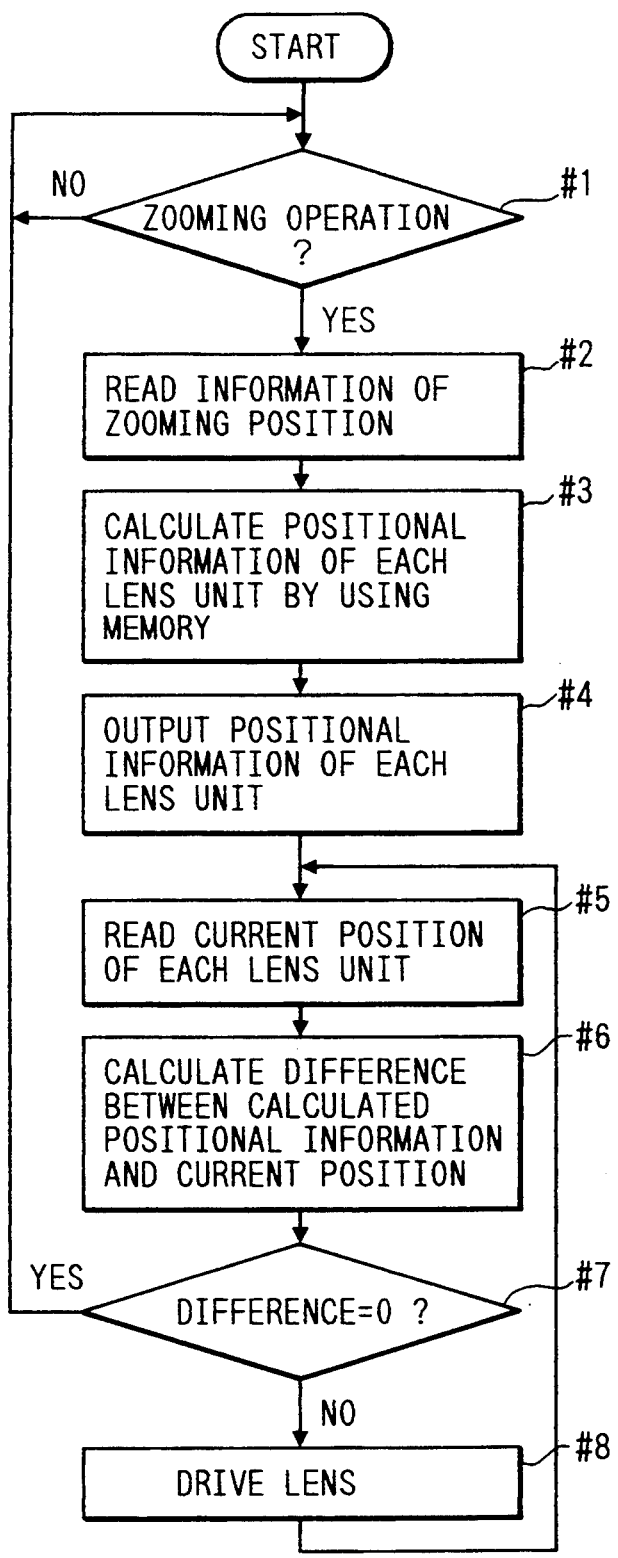
FIG. 20 is a flowchart showing the operations of the present invention.

Next, the operations of this embodiment will be described in conjunction with the flowchart of FIG. 20.

At a step 1, it is determined whether a zooming operation is activated at a zooming operation member. If no zooming operation is activated, step 1 is repeated at a certain interval (too short for an operator to recognize). If a zooming operation is activated, a processor 108 reads out zoom position information from the zooming operation member. At step 3, after completing the reading, the processor 108 executes an operation program, existing in a memory 109, to calculate the positional information or the optical-axis positions of lens units relative to an intended focal length.

Then, at a step 4, the processor 108 outputs the positional information or the optical-axis positions of the lens units to lens position controllers 107a and 107b. At a step 5, the lens position controllers 107a and 107b read out the current optical-axis positions of their responsible lens units from position detectors 105a and 105b. At a step 6, the positional information, which the processor 108 outputs previously, is compared with the current positions to calculate the differences. At a step 7, it is determined whether the differences are 0. If the differences are not 0, the lens units are driven at a step 8 to nullify the differences. Then, the operations of the steps 5 and 6 are repeated. When the differences become 0, it is determined that zooming is complete. Then, control is returned to the step 1. Then, the system is ready for the next zooming operation.

Next, operation programs existing in a memory of this embodiment will be described.

First, the principles of operation expressions used as operation programs of this embodiment will be described. Assume that the focal lengths of lens units 101a and 101b are $f_a$ and $f_b$ and the paraxial lateral powers of the lens units 101a and 101b at a reference focal length (for example, a zoom position of a wide angle edge) are $\beta_a$ and $\beta_b$. The thicknesses of the lens units are ignored. The interval D between the lens units is provided as follows:

$$D = (1-\beta_a) \times f_a + (1-1/\beta_b) \times f_b \tag{1}$$

Then, assuming that an object point and an image point are positioned at distances $S_1$ and $S'_k$ from the lens units 101a and 101b respectively, the distances $S_1$ and $S'_k$ are represented as the expressions below.

$$S_1 = (1/\beta_a - 1) \times f_a \tag{2}$$

$$S'_k = (1-\beta_b) \times f_b \tag{3}$$

Then, the distance L between the object and image points is given by the expression below.

$$L = -S_1 + D + S'_k \ (= \text{constant}) \tag{4}$$

Next, assume that the lens unit 101b is a compensation lens unit for compensating for a variation of an image surface and that the lens unit 101a moves along a designed orbit and thus changes the distance $S_1$. Then, a paraxial lateral power $\beta_a$ is given by the expression (2). Consequently, the expressions (1), (3), and (4) determine the distance $S'_k$. A change of the distance $S'_k$ from the reference focal length is recognized as a movement of the lens 101b from the reference focal length Herein, the distance $S'_k$ is a double root. A root to be adopted is determined at the time of system design. Therefore, the solution is duly selected. When the above expressions are integrated into a single relational expression $g_b$ or an operation expression in which the focal lengths of the lens units are used as input parameters, the expression becomes as follows:

$$M_b = g_b(M_a, f_a, f_b) \tag{5}$$

where, $M_a$ or $M_b$ is a movement of each of the lens units 101a and 101b from the reference focal length.

The movement $M_a$ varies depending on a zoom position, which, therefore, is written according to available zoom information. For example, the movement $M_a$ has relation to a focal length $f_T$ of an entire lens system on the basis of a certain relational expression. The expression (5) can be rewritten as shown below by changing a parameter from the movement $M_a$ to $f_T$.

$$M_b = g_b'(f_T, f_a, f_b) \tag{6}$$

If the aberration of a lens unit is not compensated for properly, a focal deviation may occur depending on the state of a diaphragm. The expression (6) may be rewritten by appending a parameter concerning the diaphragm.

The focal deviation of individual zoom lenses are measured in advance. Then, a parameter of zoom position information (herein, a focal length) in an approximate expression is replaced with a focal deviation.

$$\Delta I = h(f_T) \tag{7}$$

where, $\Delta I$ is a focal deviation.

Assuming that a paraxial longitudinal power determined with all lens units on the side of an image surface beyond a compensation lens unit is $\alpha$, an expression (4) for determining the position of a compensation lens unit can be expressed as follows:

$$L' = L - \alpha \times \Delta I \tag{4}'$$

When a parameter concerning the state of a diaphragm is appended to the expression (7) to create an approximate expression, focal deviations deriving from the state of a diaphragm are also measured. The aforesaid operation expressions are stored as programs in a memory. Thereby, the positions of individual zoom lens are corrected with a high degree of precision according to measured values of focal deviations.

In this embodiment, a memory contains operation programs. As described previously, zoom position information may be divided into a required number of portions to create correspondence tables for use in calculating positional information. Then, the correspondence tables may be stored instead of the operation programs. Alternatively, an operation expression for calculating focal deviations using a focal lengths as parameters may be replaced with a correspondence table for associating focal lengths with focal deviations. Conversion to positional information may be programmed as an operation program. Then, both the correspondence table and the operation program may be stored in the memory.

In this embodiment, a rectilinear gear and a rotary motor are used to rectilinearly move lens units. A linear cam or a helicoid linear motor may be used for rectilinear motion. Alternatively, an actuator formed with a piezoelectric element may be employed on behalf of the motor.

A coupling member is used to directly couple the rotation axis of a motor or a potentiometer. A gear may be employed to provide different rotating speeds. A rotary encoder or a linear encoder may be employed as a position detector instead of a potentiometer.

In this embodiment, an operation program or a correspondence table, to be stored in memory for actually measuring focal deviations of individual zoom lenses, should be based on the focal deviations attributable to variations in spherical aberration due to zooming which have been apparent in the process of system design. This is because a focal deviation attributable to a variation in spherical aberration is larger than a permissible focal deviation, and, therefore, is a contributing factor in increasing measurement error. Therefore, to achieve high-precision compensation, many measuring points must be specified, the degree of an approximate expression must be increased, or the number of data values in the correspondence table must be increased.

Next, a further embodiment of the present invention will be described. Components assigned the same symbols as those of the previous embodiments will not be described.

Figure 22:
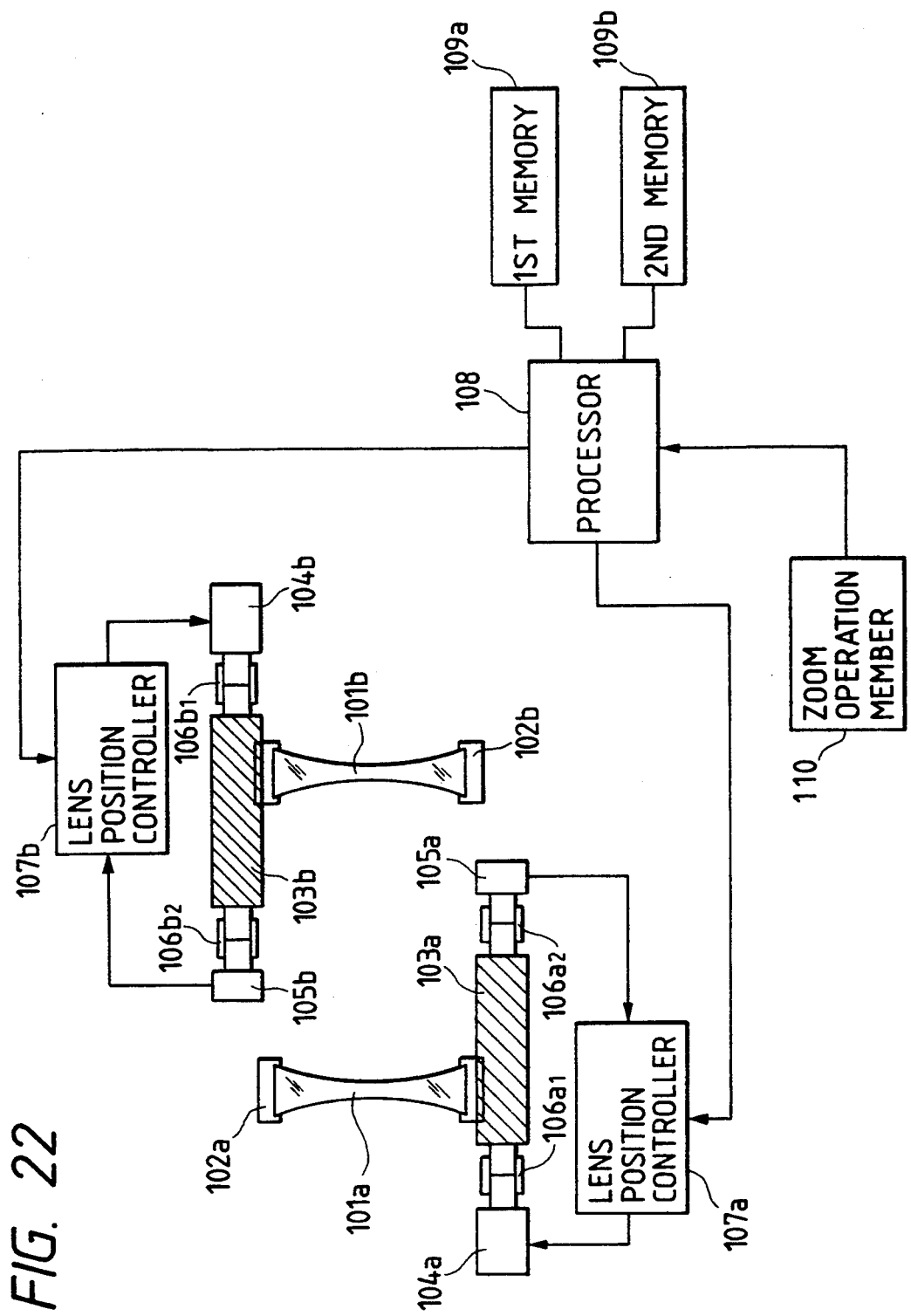
FIG. 22 is a schematic diagram of the main section of an embodiment of the present invention.
Figure 23:
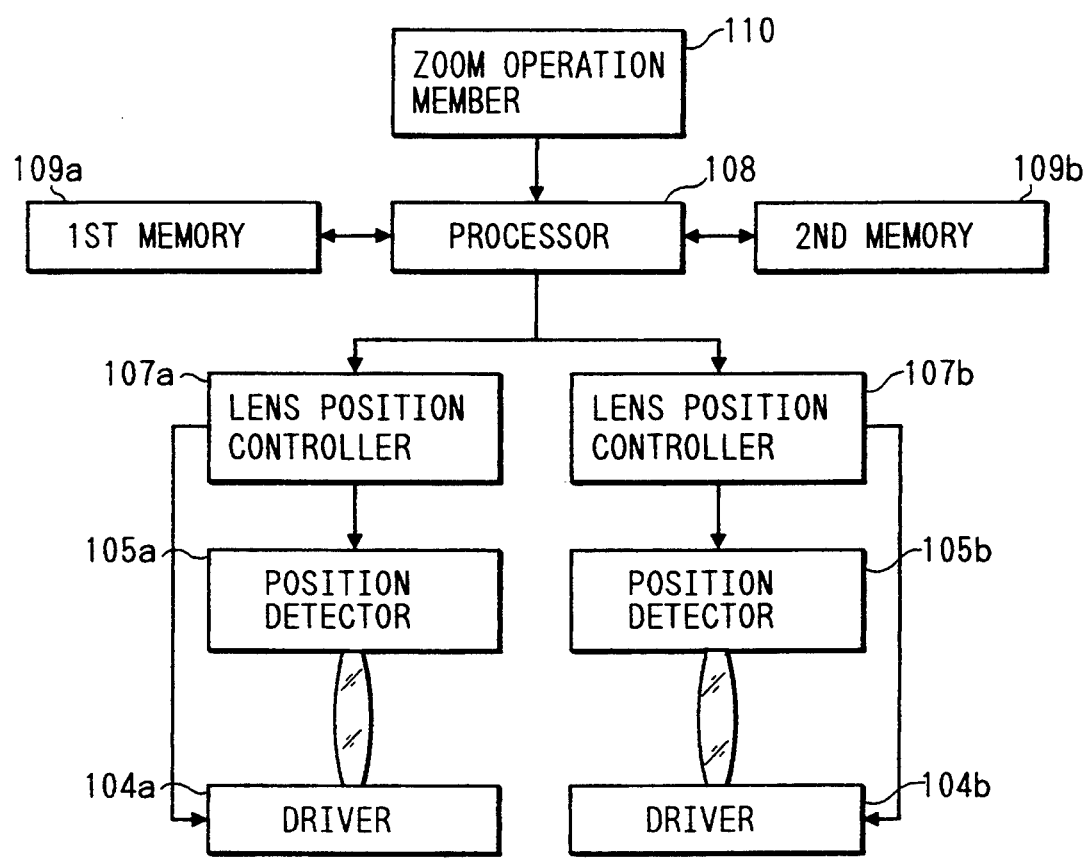
FIG. 23 is a block diagram of the main section of FIG. 22.

In FIG. 22, 109a denotes a first memory, which contains an operation program for processing the focal lengths or intervals of lens units determined in the process of system design to calculate positional information of the lens units.

In this embodiment, an operation program for calculating positional information of a compensation lens unit 101 compensates for focal deviations, occurring due to the influence of spherical aberration which varies depending on a zoom position or focal shifts, which occur depending on the state of an aperture of a diaphragm. Herein, the focal deviations or focal shifts have been clearly analyzed in the process of system design. 109b denotes a second memory containing a program or correspondence table of focal lengths vs. movements. For the program or correspondence table, individual zoom lenses are actually measured to see if there is a focal deviation, due to manufacturing error, in the focal length of a lens unit or in the interval between lens units, which has not been clearly analyzed in the process of system design. Then the measured data is processed to determine a compensation movement inherent in a compensation lens unit.

108 denotes a processor, which processes the zoom position information entered at a zoom operation member 110 and the operation program or correspondence table existing in the first memory 109a or second memory 109b, and then calculates the optical-axis positions of lens units. The processor is principally composed of a CPU.

Figure 24:
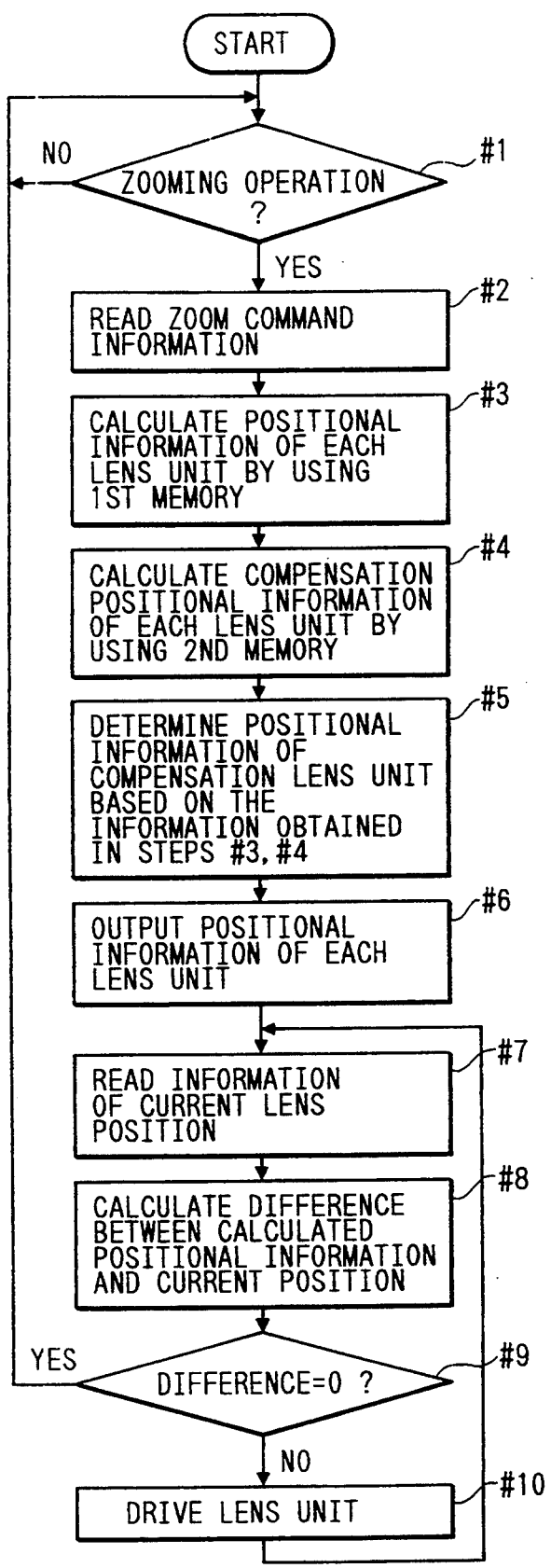
FIG. 24 is a flowchart showing the operations of the present invention.

Next, the operations of this embodiment will be described in conjunction with the flowchart of FIG. 24.

At a step 1, it is determined whether a zooming operation is activated at a zooming operation member. If no zooming operation is activated, step 1 is repeated at a certain interval (too short for an operator to recognize). If a zooming operation is activated, a processor 108 reads out zoom position information from the zooming operation member. At step 3, after completing the readout, the processor 108 executes an operation program existing in a first memory 109a to calculate the positional information or the optical-axis positions of lens units relative to an intended focal length.

At a step 4, a correspondence table existing in a second memory 109b is referenced to calculate compensation position information for a compensation lens unit as described previously. At a step 5, the compensation position information calculated at step 4 is added to the positional information or the optical-axis position of the compensation lens unit calculated at step 3 to determine the positional information of the compensation lens unit.

At a step 6, the positional information or the optical-axis positions of lens units are supplied to lens position controllers 107a and 107b. At a step 7, the lens position controllers 107a and 107b read out the current positional information or the current optical-axis positions of their responsible lens units from position detectors 105a and 105b. At a step 8, the current positional information is compared with the positional information the processor 108 outputs previously to calculate the difference between the two sets of information. At a step 9, it is determined whether the difference is 0. If the difference is not 0, the lens units are driven at a step 10 to nullify the difference. Then, the operations of the steps 7 to 9 are repeated. When the difference becomes 0, it is determined that zooming is complete. Then, control is returned to step 1 at which point the system is ready for the next zooming operation.

Next, an operation program existing in a first memory 109a of this embodiment will be described.

First, the principles of operation expressions used for the operation program of this embodiment will be described. Assume that the focal lengths of lens units 101a and 101b are $f_a$ and $f_b$ and the paraxial lateral powers of the lens units at a reference focal length (for example a zoom position of a wide angle edge) are $\beta_a$ and $\beta_b$. The thicknesses of the lens units are ignored. The interval D between the lens units is represented by the expression below.

$$D = (1-\beta_a) \times f_a + (1-1/\beta_b) \times f_b \qquad (1)a$$

At this time, an object point and an image point are positioned at distances $S_1$ and $S'_k$ from the lens unit 101a and the lens unit 101b respectively. The distances $S_1$ and $S'_k$ are given according to the expressions below.

$$S_1 = (1/\beta_a - 1) \times f_a \qquad (2)a$$

$$S'_k = (1-\beta_b) \times f_b \qquad (3)a$$

The distance L between the object and image points is given as follows:

$$L = -S_1 + D + S'_k \; (=\text{constant}) \qquad (4)a$$

Next, assume that the lens unit 101b is a compensation lens unit for compensating for a variation of an image surface and the lens unit 101a moves along a designed orbit to change the distance $S_1$. Then, the expression (2)a provides a paraxial lateral power $\beta_a$. Consequently, the expressions (1)a, (3)a, and (4)a determine a distance $S'_k$. A change of the distance $S'_k$ from the reference focal length is recognized as a movement of the lens unit 101b from the reference focal length. Herein the distance $S'_k$ is a double root. A root to be adopted is determined in the process of system design. Therefore, the solution is duly selected. The above expressions are integrated into a single relational expression or an operation expression using the focal lengths of lens units as input prameters; that is, $$M_b = g_b (M_a, f_a, f_b) \qquad (5)a$$

where, $M_a$ or $M_b$ is a movement of the lens unit 101a or 101b from the reference focal length.

The movement $M_a$ varies depending on a zoom position, which, therefore, is written according to zoom information entered. For example, the movement $M_a$ has a relation to the focal length $f_T$ of an entire lens system on the basis of a relational expression. Therefore, expression (5) can be rewritten by changing a parameter from the movement $M_a$ to $f_T$ as follows:

$$M_b = g'_b (f_T, f_a, f_b) \qquad (6)a$$

Then, in this embodiment, focal deviations attributable to spherical aberration or the state of a diaphragm aperture are subtracted from the expression (4)a. Thus, the expression (4)a compensates for focal deviations which are apparent in the process of system design.

Next, a correspondence table existing in a second memory 109b of this embodiment will be described. First, 0s are specified as compensation values in the correspondence table existent in the second memory 109b for a zoom lens concerned. In this state, only the focal deviations attributable to spherical aberration or the state of a diaphragm aperture, which are analyzed during system design, are compensated for. Therefore, focal deviations resulting from manufacturing errors cannot be eliminated. Using the zoom lens, focal deviations due to zooming or the state of a diaphragm aperture are actually measured at every focal length.

On the other hand, a sensitivity (ratio of a focal shift to a movement of a compensation lens unit) of a compensation lens unit at each focal length is calculated using design values, then listed as a table.

Compensation values at focal lengths of an object zoom lens are extracted using the aforesaid measured values and sensitivity table in order to create a correspondence table of focal lengths vs. compensation values. Then, the correspondence table is temporarily stored in the second memory 109b.

Then, focal deviations due to zooming are actually measured to calculate compensation values. Then, the compensation values are added to the previous correspondence table. This job is repeated several times until focal deviations will be within a permissible range. As a result, a zoom lens in which focal deviations are compensated for with high precision is available. Needless to say, the job may include a job concerning the position of a diaphragm.

In this embodiment, a first memory contains an operation program, and a second memory contains a correspondence table. Each of the memories may contain the operation program and/or correspondence table. For example, the correspondence table of focal lengths vs. compensation values may be stored as a program in the second memory by creating an approximate expression which has a focal length as a parameter and calculates a compensation value.

In this embodiment, a rectilinear gear and a rotary motor are used to rectilinearly move lens units. However, a linear cam or a helicoid linear motor may be employed for the rectilinear motion. Alternatively, an actuator formed with a piezoelectric element may be employed on behalf of the motor.

A coupling member is used to directly couple the rotation axis of a motor or a potentiometer. A gear may be employed to yield different rotation speeds. A potentiometer, serving as a position detector, may be replaced with a rotary encoder or a linear encoder.

In this embodiment, if an operation program or correspondence table to be stored in the first memory is based on the focal deviations, attributable to variations in spherical aberration due to zooming, which have been analyzed clearly during system design, the first memory by itself can prevent occurrence of a very great focal deviation in a zoom lens controlled with calculated positional information of lens units. This helps reduce the compensation value for a compensation lens unit.

Thereby, an operation program or a correspondence table for calculating a compensation value for a compensation lens unit can be created effortlessly. Specifically, if an approximate expression is employed for creating the operation program, the approximate expression can be a simple low-degree expression. If a correspondence table is to be created, the number of memories can be reduced. Furthermore, the number of measuring points can be lessened.

If the actual values of the focal lengths, or the lens interval between at least moving lens units of the zoom lens concerned, are used to calculate a compensation value for a compensation lens, the focal deviation can be minimized.

According to the present invention, as described previously, at least any one of lens units movable during zooming is driven and controlled using an electric means instead of cam grooves. Furthermore, a first memory is employed to record a program for providing the designed positional information of lens units during zooming, and a second memory is used to record a program or a correspondence table for compensating for variations or deviations of focus positions attributable to positional errors from set values. Thus, a camera system permitting high-quality and well-focused images in an entire zooming range is realized.

What is claimed is:

1. An apparatus for controlling lens unit positions in a zoom lens, comprising:
   a plurality of lens units movable along an optical axis for zooming;
   a focal length setting means manually for setting a focal length of said zoom lens;
   an object distance setting means for setting an object distance;
   a storage means manually containing a plurality of inherent coefficients;
   an arithmetic logic means for reading out said inherent coefficients, in association with focal length information set by said focal length setting means and object distance information set by said object distance setting means, from said storage means, and for calculating lens position information, using the read coefficients, for moving the lens units; and
   a drive control means for controlling a driving amount of each lens unit according to said lens position information.

2. An apparatus for controlling lens unit positions in a zoom lens according to claim 1, further comprising a lens position detecting means for detecting the positions of lens units, wherein said drive control means drives said lens units to substantially nullify the difference between actual lens position information detected by said lens position detecting means and calculated lens position information.

3. An apparatus for controlling lens unit positions in a zoom lens according to claim 1, wherein the lens position of a lens unit is a function of the inherent coefficients and the variables of focal length and object distance.

4. An apparatus for controlling lens unit positions in a zoom lens according to claim 3, wherein said coefficients are surface coefficients of a function for expressing a surface.

5. An apparatus for controlling lens unit positions in a zoom lens according to claim 2, further comprising:
   an error calculating means for calculating an error between said calculated lens position information and said actual lens position information; and
   a control means for moving a lens unit having the smallest sensitivity to minimize said error.

6. An apparatus for controlling lens unit positions in a zoom lens according to claim 1, wherein said storage means stores the coefficients of a function, having focal length and object distance as variables, which provides the lens position of a lens unit as a solution.

7. An apparatus for controlling lens unit positions in a zoom lens according to claim 6, wherein said storage means stores information concerning errors in manufacturing said zoom lens.

8. A camera system including a zoom lens which moves a zooming section made up of a plurality of lens units along an optical axis to achieve zooming, and moves a focusing section made up of a plurality of lens units including a portion of said zooming section along the optical axis to achieve focusing, and a memory means for storing positional coefficients, said cam system comprising:

at least one of a focal length setting means and an object distance setting means for manually inputting focal length information or object distance information;

a detecting means for detecting at least one of said focal length information and said object distance information;

an arithmetic logic means for interpreting a detected signal sent from said detecting means, selecting associated positional coefficients from the memory means of lens units in association with either focal length information, object distance information or both if applicable, and then calculating the optical-axis positions of the lens units using said positional coefficients; and a drive means for driving the lens units according to a signal sent from said arithmetic logic means.

9. A camera system according to claim 8, wherein said focusing section includes at least one lens unit which is stationary during zooming.

10. A camera system according to claim 8, wherein said zooming section includes at least one lens unit which is stationary during focusing.

11. A camera system according to any of claims 8, 9, and 10, wherein the optical-axis positions of said lens units are represented as several surfaces approximating curved surfaces, each specified with variables of focal length information and object distance information, and said positional coefficients are coefficients specifying said several approximate curved surfaces.

12. A camera system according to claim 8, wherein the optical-axis positions of said lens units are represented as approximate planes each specified with variables of focal length information and object distance information, and said positional coefficients are coefficients specifying said approximate planes.

* * * * *

UNITED STATES PATENT AND TRADEMARK OFFICE
CERTIFICATE OF CORRECTION

PATENT NO. : 5,448,413
DATED : September 5, 1995
INVENTOR(S) : Takaaki Kobayashi, et al.

It is certified that error appears in the above-indentified patent and that said Letters Patent is hereby corrected as shown below:

COLUMN 2:

Line 7, "No. 4161756" should read --No. 4,161,756--.

COLUMN 3:

Line 35, "other" should read --another--.

COLUMN 5:

Line 29, "$Y_a$" should read --$y_a$-- and "$Y_2$" should read --$y_2$--.

COLUMN 6:

Line 19, "$C = (Z_{27}-ax_7-by_2$" should read --$C = Z_{27}-ax_7-by_2$--.

COLUMN 7:

Line 39, "calculator 12. 9a" should read --calculator 12. ¶9a--; and
Line 60, "are" should read --as-- and "obtain" should read --obtains--.

UNITED STATES PATENT AND TRADEMARK OFFICE
CERTIFICATE OF CORRECTION

PATENT NO. : 5,448,413
DATED : September 5, 1995
INVENTOR(S) : Takaaki Kobayashi, et al.

It is certified that error appears in the above-indentified patent and that said Letters Patent is hereby corrected as shown below:

COLUMN 9:

Line 34, "$\Delta p3=0$" should read --$\Delta P3=0$--.

COLUMN 10:

Line 18, "the" should be deleted.

COLUMN 11:

Line 31, "Next," should read --¶Next,--; and,
Line 33, "controls" should read --control--.

COLUMN 13:

Line 49, "(105b," should read --(105b)--.

COLUMN 15:

Line 52, "length" should read --length.--.

COLUMN 16:

Line 42, "a" should be deleted.

UNITED STATES PATENT AND TRADEMARK OFFICE
CERTIFICATE OF CORRECTION

PATENT NO. : 5,448,413
DATED : September 5, 1995
INVENTOR(S) : Takaaki Kobayashi, et al.

It is certified that error appears in the above-indentified patent and that said Letters Patent is hereby corrected as shown below:

COLUMN 20:

Line 29, "manually for" should read --for manually--; and

COLUMN 21:

Line 16, "cam" should read --camera--.

Signed and Sealed this

Ninth Day of January, 1996

BRUCE LEHMAN

*Attest:*

*Attesting Officer*  *Commissioner of Patents and Trademarks*